United States Patent
Ozeki et al.

(10) Patent No.: US 10,240,281 B2
(45) Date of Patent: Mar. 26, 2019

(54) CLOTHING ITEM SEPARATING DEVICE AND CLOTHING ITEM PROCESSING DEVICE COMPRISING SAME

(71) Applicant: Panasonic Intellectual Property Management Co., Ltd., Osaka (JP)

(72) Inventors: Yuji Ozeki, Shiga (JP); Shinji Suematsu, Shiga (JP); Hiroshi Kohso, Osaka (JP); Hiroshi Horibata, Shiga (JP); Junichi Nawama, Hyogo (JP); Masahiro Kawai, Shiga (JP); Yasunori Matsunari, Shiga (JP); Masataka Kitajima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/540,841

(22) PCT Filed: Jul. 6, 2016

(86) PCT No.: PCT/JP2016/003216
§ 371 (c)(1),
(2) Date: Jun. 29, 2017

(87) PCT Pub. No.: WO2017/037986
PCT Pub. Date: Mar. 9, 2017

(65) Prior Publication Data
US 2017/0356124 A1    Dec. 14, 2017

(30) Foreign Application Priority Data
Aug. 28, 2015 (JP) .................................. 2015-169695

(51) Int. Cl.
*B25J 9/16* (2006.01)
*B25J 11/00* (2006.01)
(Continued)

(52) U.S. Cl.
CPC ............ *D06F 95/00* (2013.01); *B25J 9/0087* (2013.01); *B25J 9/0096* (2013.01); *B25J 9/023* (2013.01);
(Continued)

(58) Field of Classification Search
CPC ....... B25J 9/1697; B25J 11/008; D06F 25/00; D06F 33/02; D06F 37/22; D06F 37/28;
(Continued)

(56) References Cited

U.S. PATENT DOCUMENTS

| 5,168,645 A | 12/1992 | Robin et al. |
| 2004/0073332 A1 | 4/2004 | Weir |

(Continued)

FOREIGN PATENT DOCUMENTS

| EP | 971062 A2 | 1/2000 |
| EP | 1 942 223 A2 | 7/2008 |

(Continued)

OTHER PUBLICATIONS

International Search Report, and English language translation thereof, in corresponding International Application No. PCT/JP2016/003216, dated Oct. 11, 2016, 5 pages.

(Continued)

*Primary Examiner* — Levon J Shahinian
(74) *Attorney, Agent, or Firm* — Brinks Gilson & Lione

(57) ABSTRACT

A clothes separating device and a clothes processing apparatus including the clothes separating device according to this disclosure are provided with a separator that operates to grip clothes in a washing tub and to separate, from the gripped clothes, another item of clothes entwined with the gripped clothes. In this manner, a user does not need to separate a plurality of individual items of clothes before folding the clothes. Hence, it is possible to provide the clothes separating device that contributes to reducing a (Continued)

burden of work related to laundry and a clothes processing apparatus including the clothes separating device.

15 Claims, 16 Drawing Sheets

(51) Int. Cl.
*D06F 25/00* (2006.01)
*D06F 33/02* (2006.01)
*D06F 37/22* (2006.01)
*D06F 37/28* (2006.01)
*D06F 37/30* (2006.01)
*D06F 39/00* (2006.01)
*D06F 39/02* (2006.01)
*D06F 39/08* (2006.01)
*D06F 39/14* (2006.01)
*D06F 89/02* (2006.01)
*D06F 95/00* (2006.01)
*D06F 35/00* (2006.01)
*B25J 9/00* (2006.01)
*B25J 9/02* (2006.01)
*B25J 13/08* (2006.01)
*B25J 19/02* (2006.01)
*D06F 93/00* (2006.01)
*D06F 29/00* (2006.01)

(52) U.S. Cl.
CPC .......... *B25J 13/085* (2013.01); *B25J 19/023* (2013.01); *D06F 25/00* (2013.01); *D06F 33/02* (2013.01); *D06F 35/00* (2013.01); *D06F 37/22* (2013.01); *D06F 37/28* (2013.01); *D06F 37/304* (2013.01); *D06F 39/005* (2013.01); *D06F 39/02* (2013.01); *D06F 39/088* (2013.01); *D06F 39/14* (2013.01); *D06F 89/023* (2013.01); *D06F 93/00* (2013.01); *B25J 9/1697* (2013.01); *B25J 11/008* (2013.01); *D06F 29/00* (2013.01); *D06F 2232/10* (2013.01)

(58) Field of Classification Search
CPC ...... D06F 37/304; D06F 39/005; D06F 39/02; D06F 39/088; D06F 39/14; D06F 89/023; D06F 95/00; D06F 2232/10
USPC ......... 38/7, 12, 143; 68/20; 209/937; 414/13
See application file for complete search history.

(56) References Cited

U.S. PATENT DOCUMENTS

2006/0124433 A1 6/2006 Weir
2008/0295367 A1* 12/2008 McCabe ................. D06F 67/04
38/143

FOREIGN PATENT DOCUMENTS

JP H02-077300 A 3/1990
JP 2000-051593 A 2/2000
JP 2006-255195 A 9/2006

OTHER PUBLICATIONS

English Translation of Chinese Search Report dated Jun. 20, 2018 for the related Chinese Patent Application No. 201680002323.1.

* cited by examiner

CLOTHING ITEM SEPARATING DEVICE AND CLOTHING ITEM PROCESSING DEVICE COMPRISING SAME

This application is a 371 application of PCT/JP2016/003216 having an international filing date of Jul. 6, 2016, which claims priority to JP 2015-169695 filed Aug. 28, 2015, the enter contents of which are incorporated herein by reference.

TECHNICAL FIELD

This disclosure relates to a clothes separating device and a clothes processing apparatus including the clothing separating device.

BACKGROUND ART

A drum type washing machine that has a dry function of drying clothes is known. In this washing machine, clothes in a drum are washed through rotation of the drum, the clothes are spin-dried through rotation of the drum, and the clothes are dried through supplying of hot air into the drum and rotation of the drum. Note that PTL 1 discloses an example of a drum type washing machine.

A plurality of items of clothes, which are subjected to washing, spin-drying, and drying by the washing machine described above, may be intertwined with each other during processes thereof. In this case, a user needs to separate a plurality of individual items of clothes before folding the clothes. This increases a burden of work related to laundry. Note that, here, such problems in the drum type washing machine is examined; however, the same problems also arise in a washing machine other than the drum type washing machine such as a vertical type washing machine.

CITATION LIST

Patent Literature

PTL 1: Japanese Patent Unexamined Publication No. 2006-255195

SUMMARY OF THE INVENTION

An object of this disclosure is to provide a clothes separating device that contributes to reducing a burden of work related to laundry and a clothes processing apparatus including the clothes separating device.

An aspect of the clothes separating device according to this disclosure includes a separator that operates to grip clothes in a washing tub and to separate, from the gripped clothes, another item of clothes entwined with the gripped clothes.

An aspect of the clothes processing apparatus according to this disclosure includes a washing machine that includes the washing tub and a dryer that dries clothes; the clothes separating device; and a folding device that folds clothes unloaded from the washing tub by the clothes separating device.

The clothes separating device described above and the clothes processing apparatus including the clothes separating device contribute to reducing a burden of work related to laundry.

Figure 1:
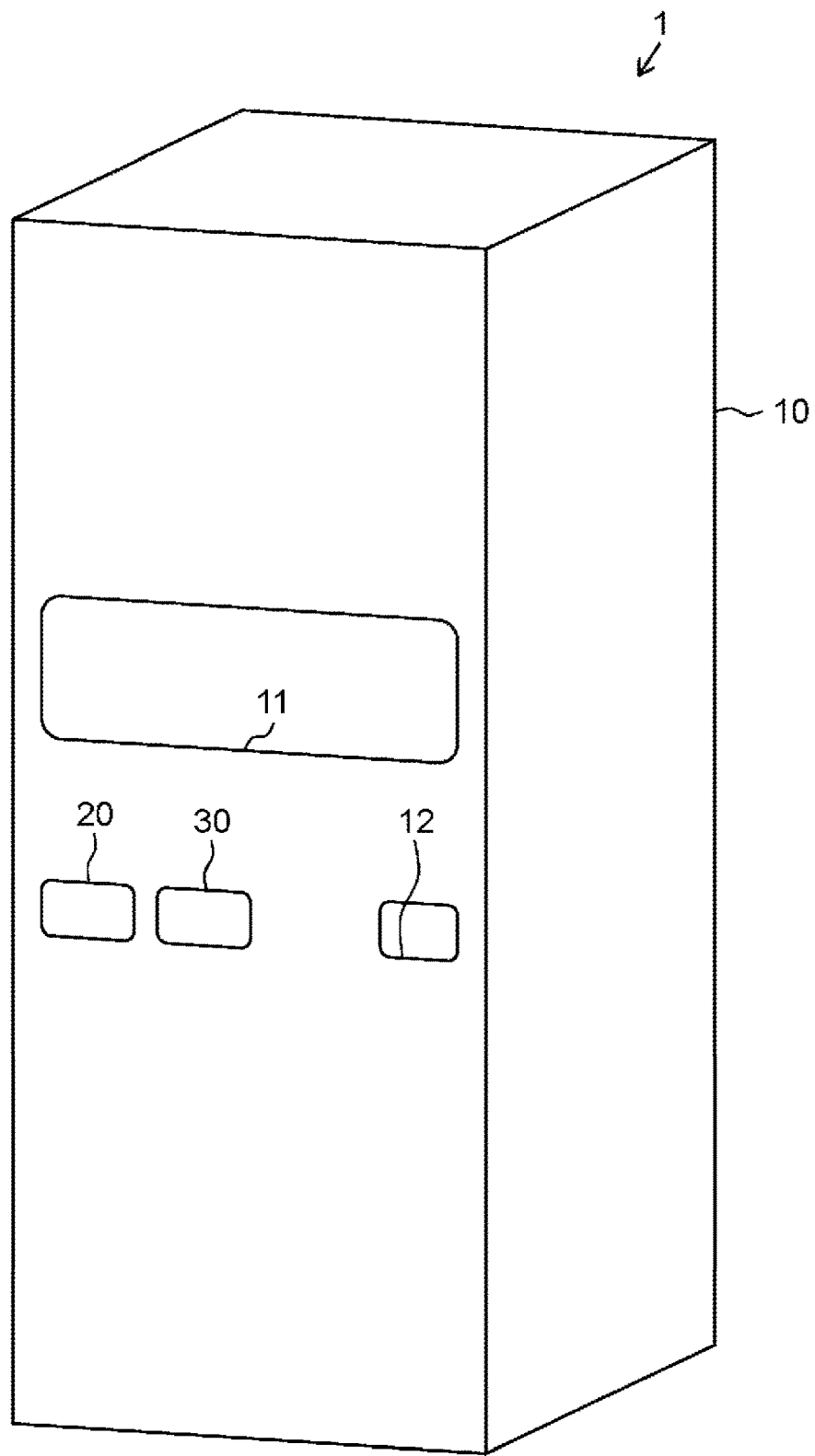
FIG. 1 is a perspective view of a clothes processing apparatus of an exemplary embodiment.

DESCRIPTION OF EMBODIMENTS (Example of Exemplary Embodiment of Clothes Separating Device and Clothes Processing Apparatus Including Clothes Separating Device)

A clothes separating device of a first aspect of this disclosure includes a separator that operates to grip clothes in a washing tub and to separate, from the gripped clothes, another item of clothes entwined with the gripped clothes.

The clothes separating device described above, for example, operates to grip one item of clothes of a plurality of items of clothes in the washing tub and to separate the other clothes entwined with the gripped clothes. Therefore, it is easy to separate the other clothes from the clothes gripped by the separator. In other words, even when the plurality of clothes are intertwined with one another in the washing tub, it is easy to separate the plurality of clothes into individual items of clothes by the clothes separating device described above. Therefore, a user is unlikely to encounter a situation in which it is necessary to separate the plurality of clothes into individual items of clothes before folding. As described above, the clothes separating device described above contributes to reducing a burden of work related to laundry.

In the clothes separating device of a second aspect, the separator includes a gripping unit that is capable of gripping clothes in the washing tub, and a force applying unit that applies a force to at least the other clothes such that the other clothes entwined with the clothes gripped by the gripping unit is separated from the gripped clothes.

In the clothes separating device of a third aspect, the separator includes a plurality of the gripping units.

According to the clothes separating device described above, the clothes are gripped by the gripping units, and a force is applied to the other clothes entwined with the gripped clothes. Therefore, compared to a case where one gripping unit is provided, high efficiency of work of separating the plurality of clothes in the washing tub into individual items of clothes is obtained.

In the clothes separating device of a fourth aspect, the force applying unit includes an actuator that vibrates the gripping unit.

According to the clothes separating device described above, the actuator vibrates the gripping unit, and thereby the force is applied to the other clothes. In other words, the force is directly applied to the other clothes due to an operation of the gripping unit. Therefore, compared to a case of including another element that applies the force to the other clothes, the clothes separating device has a simplified configuration.

In the clothes separating device of a fifth aspect, the force applying unit vibrates the gripping unit such that the clothes gripped by the gripping unit move in a vertical direction.

In a case where the clothes gripped by the gripping unit move in the vertical direction, a strong force is applied to the other clothes entwined with the clothes, compared to a case where the clothes move in a frontward-rearward direction or in a horizontal direction. This is considered to be related to adding a weight of the other clothes to the force. Therefore, it is even easier to separate the other clothes from the clothes gripped by the gripping unit.

In the clothes separating device of a sixth aspect, the force applying unit includes a blower.

In a case where the force is directly applied to the other clothes due to the operation of the gripping unit, a magnitude of the force applied to the other clothes is likely to rely on the weight or the like of the clothes. On the other hand, in a case where the force is applied to the other clothes due to another element other than the operation of the gripping unit, the magnitude of the force applied to the other clothes is unlikely to rely on the weight or the like of the clothes. According to the clothes separating device described above, since a force of wind supplied from the blower is applied to the other clothes, a force having a stable magnitude is likely to be applied to the other clothes.

In the clothes separating device of a seventh aspect, the force applying unit includes a moving member that is capable of moving with respect to the gripping unit, and the moving member is capable of moving from a first position, which is separate from the gripping unit, to a second position at which the moving member is able to come into contact with the clothes gripped by the gripping unit.

In a case where a physical force is applied to the other clothes, the force is likely to be transmitted to the other clothes. According to the clothes separating device described above, the moving member moves with respect to the gripping unit, and thereby the moving member comes into contact with the clothes gripped by the gripping unit such that a physical force produced from the contact is directly or indirectly applied to the other clothes. Therefore, it is even easier to separate the other clothes from the clothes gripped by the gripping unit.

In the clothes separating device of a eighth aspect, the moving member includes a transport unit that is capable of transporting the clothes into the washing tub.

In the clothes separating device described above, the transport unit functions as the moving member. Therefore, compared to a case of including a moving member separately from the transport unit, the clothes separating device has a simplified configuration.

In the clothes separating device of a ninth aspect, the separator includes a first gripping unit and a second gripping unit which are gripping units that are capable of gripping the clothes in the washing tub, and the first gripping unit and the second gripping unit relatively operate so as to separate the other clothes from the gripped clothes.

According to the clothes separating device described above, the first gripping unit grips one item of clothes of the plurality of clothes in the washing tub and the second gripping unit grips the other clothes entwined with the gripped clothes. The first gripping unit and the second gripping unit relatively operate, and thereby the clothes gripped by the first gripping unit are pulled apart from the other clothes gripped by the second gripping unit such that the other clothes are separated from the clothes gripped by the first gripping unit. In addition, even in a case where another item of clothes is still entwined with the clothes gripped by the first gripping unit, it is easy to separate the other clothes from the clothes gripped by the first gripping unit due to the operations of the gripping units. Therefore, it is even easier to separate the other clothes from the clothes gripped by the gripping unit.

The clothes separating device of a tenth aspect further includes a control device that controls the gripping unit.

The clothes separating device of a eleventh aspect further includes a load detector that detects a load acting on the gripping unit, in which the control device controls the gripping unit, based on the load detected by the load detector.

In a case where a high load acts on the gripping unit, for example, the clothes gripped by the gripping unit is considered to be caught in another element. In this case, when the control device controls the gripping unit, there is a possibility that a strong force will act on a portion of the clothes which is caught in the other element and the portion will be degraded. On the other hand, since the clothes separating device described above controls the gripping unit, based on the load detected by the load detector, a possibility of degradation of the clothes gripped by the gripping unit is reduced.

In the clothes separating device of a twelfth aspect, the control device stops the gripping unit in a case where the load detected by the load detector is higher than or equal to a predetermined load.

According to the clothes separating device described above, since the gripping unit is controlled by the control device as the twelfth aspect described above, the clothed gripped by the gripping unit are unlikely to be degraded.

The clothes separating device of a thirteenth aspect, further includes an imaging device that is capable of imaging an inside of the washing tub that accommodates clothes, in which the control device controls the gripping unit, based on image information acquired by the imaging device.

According to the clothes separating device described above, for example, it is possible to recognize positions of clothes accommodated in the washing tub from the image information acquired by the imaging device. Therefore, it is easy for the gripping unit to appropriately grip the clothes accommodated in the washing tub.

In the clothes separating device of a fourteenth aspect, in a case where the control device determines that clothes are present in the washing tub, based on the image information acquired by the imaging device, the control device controls the gripping unit such that the clothes in the washing tub are gripped.

According to the clothes separating device described above, whether or not clothes are present in the washing tub is determined, based on the image information acquired by the imaging device. Therefore, the gripping unit is controlled as in the fourteenth aspect described above, a possibility of remaining of the clothes in the washing tub is reduced.

An aspect of the clothes processing apparatus according to this disclosure includes a washing machine that includes the washing tub and a dryer that dries clothes; the clothes separating device; and a folding device that folds clothes unloaded from the washing tub by the clothes separating device.

According to the clothes processing apparatus described above, substantially the same effects as the effects obtained by the clothes separating device of the first aspect to the fourteenth aspect described above are obtained. Therefore, it is possible to fold, for each item of clothes by the folding device, a plurality of clothes, which are washed, dried, or the like. As described above, the clothes processing apparatus contributes to reducing a burden of work related to laundry.

Exemplary Embodiment

FIG. 1 illustrates the external appearance of clothes processing apparatus 1. Clothes processing apparatus 1 is an apparatus for performing washing, drying, and the like, on a plurality of clothes, and folding the plurality of clothes subjected to washing, drying, and the like, for each item of clothes. Clothes processing apparatus 1 includes main-body case 10, clothes loading unit 11, detergent loading unit 12, operating unit 20, and notification unit 30.

Main-body case 10 has a function of accommodating a plurality of mechanical elements. Main-body case 10 is installed on an installation surface (not illustrated) of a floor or the like. Main-body case 10 has a rectangular parallelepiped shape of which a longitudinal direction and a lateral direction are definable, for example.

Clothes loading unit 11 is an opening for loading clothes inside main-body case 10. Clothes loading unit 11 is formed in a front surface of main-body case 10, and has a size to the extent that a plurality of clothes are able to be loaded. Clothes loading unit 11 is covered with a cover (not illustrated) which is, for example, automatically or manually closeable and openable.

Detergent loading unit 12 is an opening for loading detergent into washing machine 40 (refer to FIG. 2) that is accommodated in main-body case 10. Detergent loading unit 12 is formed, for example, in the front surface of main-body case 10. Detergent loading unit 12 is covered with a cover (not illustrated) which is, for example, automatically or manually closeable and openable.

Operating unit 20 has a function of inputting information related to an operation of clothes processing apparatus 1. Operating unit 20 is provided, for example, in the front surface of main-body case 10. Notification unit 30 has a function of outputting information. Notification unit 30 is provided, for example, in the front surface of main-body case 10. Notification unit 30 outputs information associated with an operation of operating unit 20, abnormality of an operation of clothes processing apparatus 1, or the like.

Figure 2:
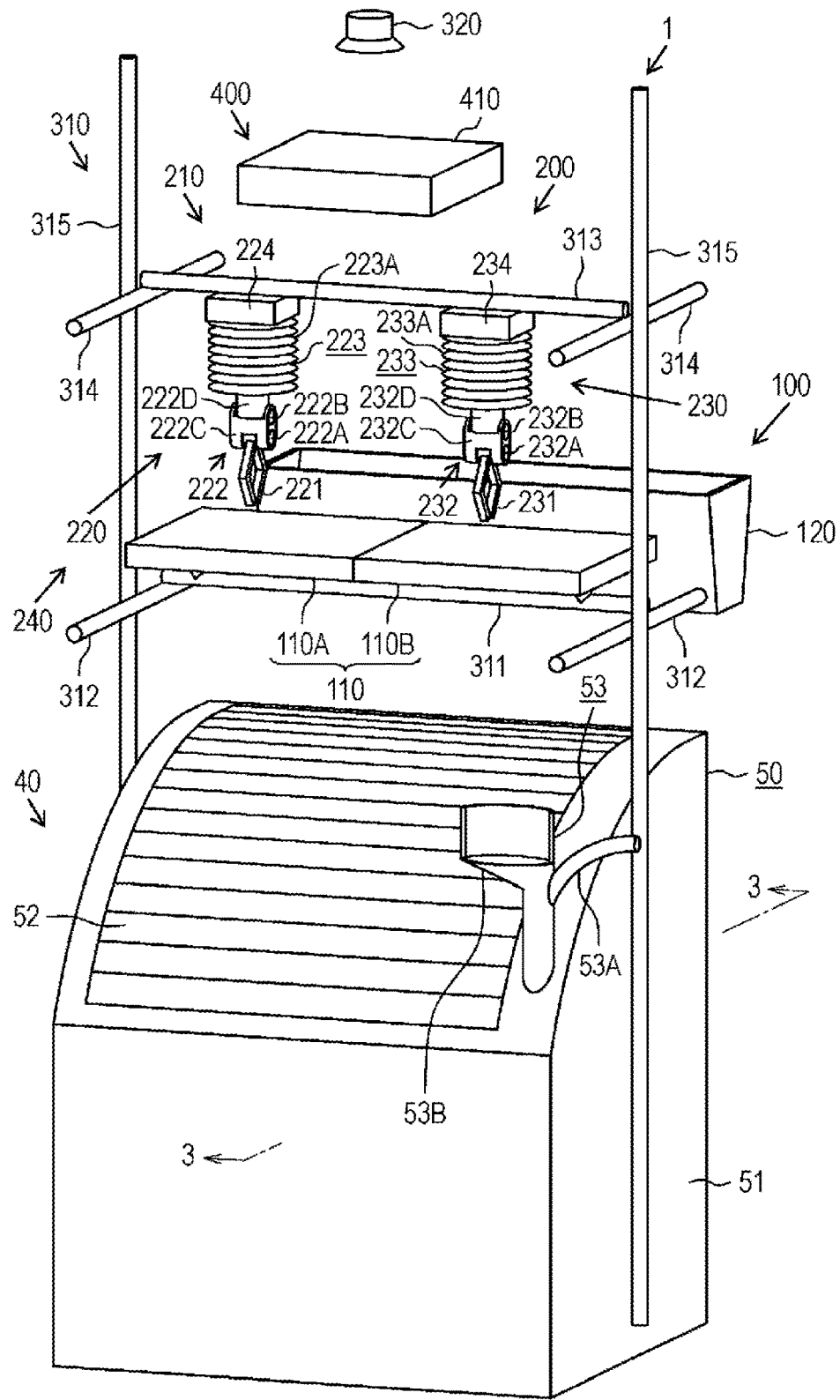
FIG. 2 is a perspective view illustrating an internal structure of the clothes processing apparatus in FIG. 1.

FIG. 2 illustrates an internal structure of clothes processing apparatus 1. Clothes processing apparatus 1 further includes washing machine 40 including washing tub 70 (refer to FIG. 3) that accommodates clothes, clothes transport device 100 that is capable of transporting the clothes into washing tub 70, clothes separating device 200 that is capable of unloading the clothes from washing tub 70, and folding device 400 that folds the clothes.

Washing machine 40 has functions of washing, drying, and the like of the clothes. Washing machine 40 is installed on a surface corresponding to a bottom surface of an inner surface of main-body case 10 (refer to FIG. 1). Note that, since a specific configuration and operations of washing machine 40 are disclosed, for example, in Japanese Patent Unexamined Publication No. 2006-255195, a part of the entire description thereof is omitted.

Figure 3:
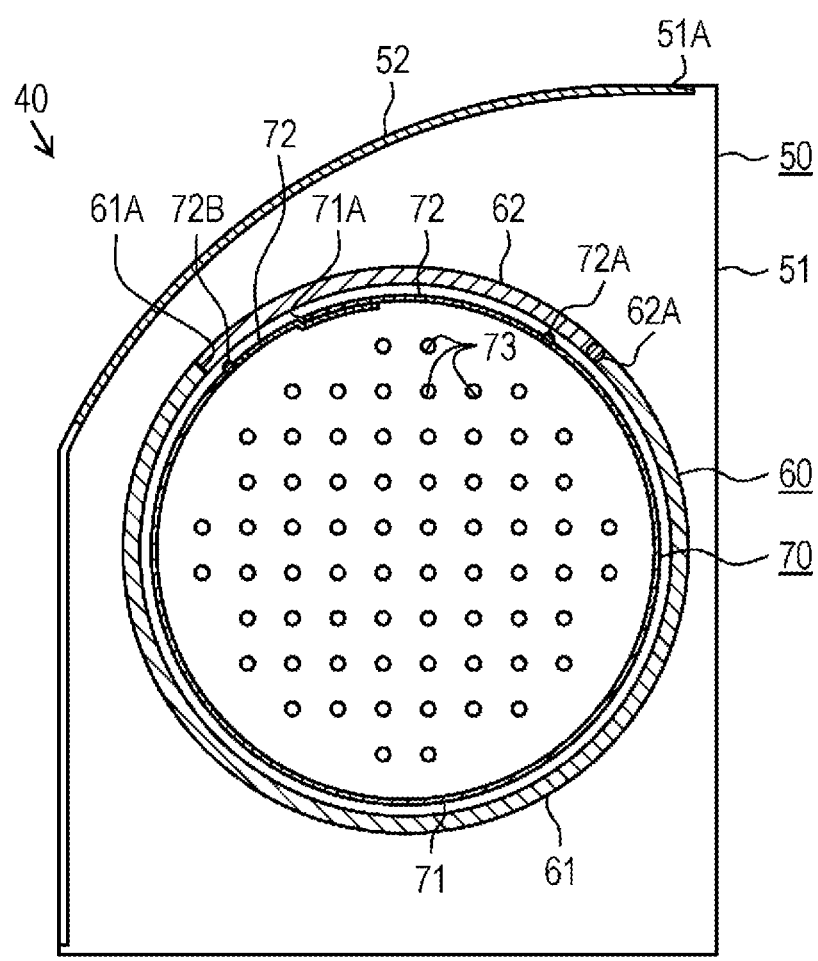
FIG. 3 is a sectional view taken along line 3-3 in FIG. 2.

FIG. 3 illustrates an internal structure of washing machine 40. For example, washing machine 40 is a drum type washing machine.

Washing machine 40 includes a main body 50 that configures the external appearance, an outer tub unit 60 provided inside main body 50, and washing tub 70 provided inside outer tub unit 60.

Main body 50 includes a housing 51, main-body lid 52, and water supply tube 53 (refer to FIG. 2). Housing 51 has a function of accommodating outer tub unit 60 and washing tub 70 inside. Housing 51 has a substantially rectangular parallelepiped shape, and has a curved top surface. Housing 51 is provided with first opening 51A as an opening formed in the top surface.

Main-body lid 52 has a function of opening or closing first opening 51A. Main-body lid 52 has a sheet shape formed of, for example, a plurality of rectangular columns which are continuously aligned so as to be bendable. Main-body lid 52 is attached to housing 51 so as to be slidable with respect to housing 51. Specifically, both end portions of the rectangular columns of main-body lid 52 are supported by a pair of rails (not illustrated) which is formed in housing 51. Main-body lid 52 is controlled to slide along the rails, and thereby first opening 51A is opened or closed. Note that FIG. 3 illustrates a state in which first opening 51A is closed by main-body lid 52.

Water supply tube 53 illustrated in FIG. 2 has a function of supplying washing water, in which water and detergent are mixed, to outer tub unit 60. Water supply tube 53 includes water passage 53A, detergent passage 53B, and a detergent storage portion (not illustrated). Water passage 53A has a function of supplying water to outer tub unit 60. Water passage 53A connects a water source and outer tub unit 60. Detergent passage 53B has a function of supplying detergent to water flowing through water passage 53A. Detergent passage 53B connects, for example, detergent loading unit 12 (refer to FIG. 1) and detergent storage portion.

The detergent storage portion has a function of storing detergent loaded via detergent passage 53B from detergent loading unit 12. Detergent storage portion is provided in, for example, water passage 53A, and supplies detergent to water flowing through water passage 53A. In other words, the water flowing through water passage 53A is mixed with the detergent stored in the detergent storage portion, and washing water produced in this manner is supplied to outer tub unit 60 via water passage 53A.

As illustrated in FIG. 3, outer tub unit 60 includes outer tub 61 and outer-tub lid 62. Outer tub 61 has a function of accommodating washing tub 70. Outer tub 61 has a substantially circular cylinder shape. Outer tub 61 supports washing tub 70 in a rotatable manner. For example, outer tub 61 is supported by a damper (not illustrated) provided on a surface corresponding to a bottom surface of an inner surface of housing 51. The damper has a function of absorbing vibration produced due to rotation of washing tub 70. Outer tub 61 is provided with second opening 61A as an opening formed in a side surface thereof.

Outer-tub lid 62 has a function of opening or closing second opening 61A. Outer-tub lid 62 is attached to outer tub 61 so as to be rotatable around support shaft 62A that extends from one end surface to the other end surface of outer tub 61. Support shaft 62A is fixed to outer-tub lid 62, and is supported by outer tub 61 to be rotatable with respect to outer tub 61. Outer-tub lid 62 is controlled to rotate with respect to outer tub 61, and thereby second opening 61A is opened or closed. Note that FIG. 3 illustrates a state in which second opening 61A is closed by outer-tub lid 62.

Outer-tub lid 62 is provided with packing (not illustrated) on edges thereof. Packing has a function of making it difficult for the washing water, which is supplied to outer tub 61 via water supply tube 53 (refer to FIG. 2), to leak outside. The washing water supplied from water supply tube 53 flows from a water supply port (not illustrated) provided in outer tub 61, is supplied to washing tub 70, and is drained outside from a drain port (not illustrated) provided in outer tub 61.

Washing tub 70 includes drum 71 and a pair of drum lids 72. Drum 71 has functions of accommodating clothes, washing the clothes with the washing water, and the like. Drum 71 has a substantially circular cylinder shape. The washing water supplied to outer tub 61 flows into drum 71 via a plurality of holes 73 formed in a side surface and an end surface of drum 71, and is drained to outer tub 61 via the plurality of holes 73. Drum 71 is provided with third opening 71A as an opening formed in a side surface thereof.

Drum lid 72 has a function of opening or closing third opening 71A. For example, one drum lid 72 is attached to drum 71 so as to be rotatable around first support shaft 72A that extends from one end surface to the other end surface of drum 71. First support shaft 72A is fixed to one drum lid 72, and is supported by drum 71 to be rotatable with respect to drum 71. For example, the other drum lid 72 is attached to drum 71 so as to be rotatable around second support shaft 72B that extends from one end surface to the other end surface of drum 71. Second support shaft 72B is fixed to the other drum lid 72, and is supported by drum 71 to be rotatable with respect to drum 71. In other words, the pair of drum lids 72 forms double lids. Note that FIG. 3 illustrates a state in which third opening 71A is closed by drum lid 72.

For example, drum lid 72 is configured to be capable of operating by interlocking with an operation of outer-tub lid 62. Therefore, rotation of outer-tub lid 62 with respect to outer tub 61 causes drum lids 72 to rotate with respect to drum 71 such that third opening 71A is opened or closed. All of first opening 51A, second opening 61A, and third opening 71A are opened, and thereby opening 40A (refer to FIG. 10), through which the inside of drum 71 and the outside communicate with each other, is formed.

Figure 4:
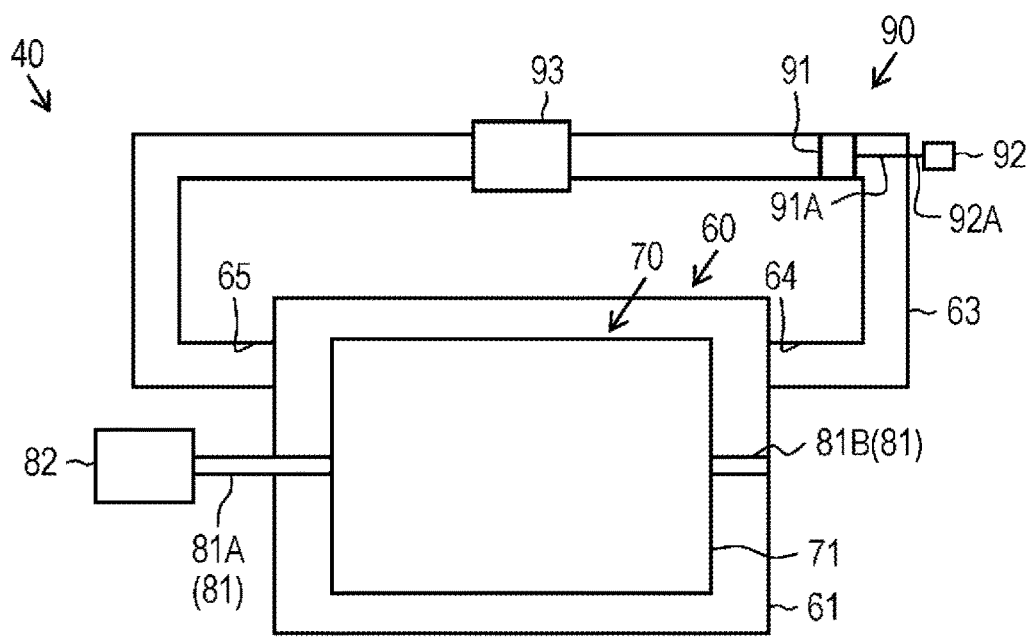
FIG. 4 is a view schematically illustrating a part of an internal structure of a washing machine in FIG. 2.

As illustrated in FIG. 4, washing machine 40 further includes rotary shaft 81, drum motor 82, and dryer 90. Rotary shaft 81 has a function of causing drum 71 to rotate with respect to outer tub 61. Rotary shaft 81 includes first rotary shaft 81A and second rotary shaft 81B. First rotary shaft 81A has one end portion that is coupled to an output shaft of drum motor 82 and the other end portion that is rotatably supported by outer tub 61 and is fixed to the one end surface of drum 71. Second rotary shaft 81B has one end portion that is rotatably supported by outer tub 61 and the other end portion that is fixed to the other end surface of drum 71.

For example, drum motor 82 is a brushless DC motor. Rotation of drum motor 82 in a first direction causes first rotary shaft 81A to rotate in the first direction such that drum 71 rotates with respect to outer tub 61 in the first direction. Rotation of drum motor 82 in a second direction opposite to first direction causes first rotary shaft 81A to rotate in the second direction such that drum 71 rotates with respect to outer tub 61 in the second direction.

Dryer 90 has functions of supplying hot air into washing tub 70 and drying clothes accommodated in drum 71. For example, dryer 90 is provided in wind duct 63 as a part of outer tub unit 60. Wind duct 63 has a function of circulating hot air in drum 71. Dryer 90 includes blower 91, fan motor 92, and heat pump 93.

Blower 91 has a function of generating wind such that air circulates in wind duct 63. For example, blower 91 is a vortex fan having four vanes. Fan motor 92 has a function of causing blower 91 to rotate. For example, fan motor 92 is provided outside wind duct 63, and has output shaft 92A that penetrates through wind duct 63 and is coupled to rotary shaft 91A of blower 91. Heat pump 93 has a function of heating the air in wind duct 63. For example, heat pump 93 condenses moisture contained in damp air flowing into wind duct 63, and then heats the air.

The damp air in drum 71 passes through the plurality of holes 73 (refer to FIG. 3) and flows into wind duct 63 from drain port 64 formed in outer tub 61, and the air circulates to air supply port 65 formed in outer tub 61 with the rotation of blower 91. The air flowing through wind duct 63 during a process of circulation in wind duct 63 is heated by heat pump 93, and hot air produced with blower 91 and heat pump 93 flows out from air supply port 65. Therefore, hot air is supplied into drum 71 via the plurality of holes 73 and clothes accommodated in drum 71 are dried.

Figure 5:
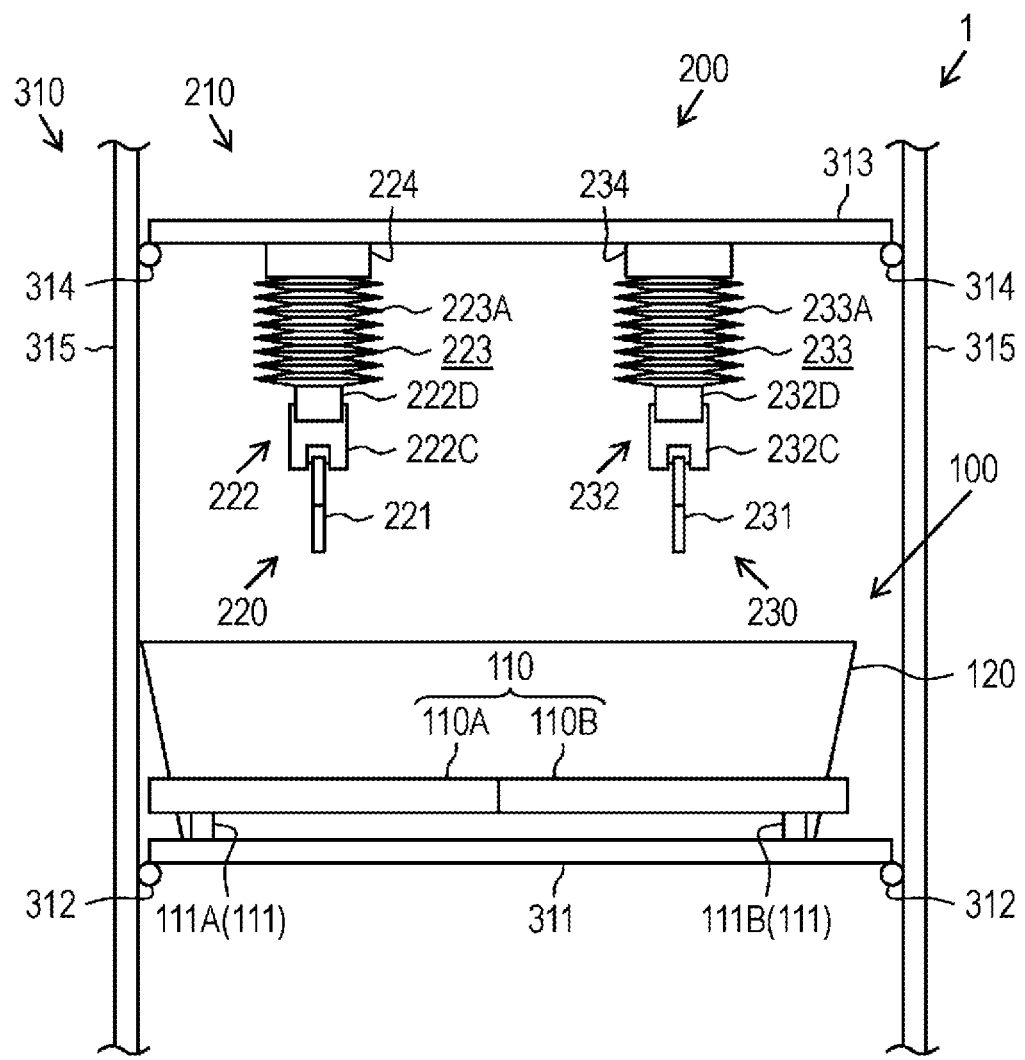
FIG. 5 is a front view illustrating a part of the clothes processing apparatus in FIG. 2.

FIG. 5 illustrates a part of a configuration of clothes transport device 100. Clothes transport device 100 includes mounting board 110 as a transport unit, and mounting-board support 111 as a transport support. Mounting board 110 has a function of transporting, into drum 71 (refer to FIG. 3), clothes loaded from clothes loading unit 11 (refer to FIG. 1). Mounting board 110 is a plate having a rectangular parallelepiped shape of which the longitudinal direction and the lateral direction are definable, for example. Mounting board 110 includes first mounting board 110A and second mounting board 110B. First mounting board 110A and second mounting board 110B are coupled to each other.

Mounting-board support 111 has a function of supporting mounting board 110 in an inclinable manner such that mounted clothes CS as clothes, which are mounted on mounting board 110, are dropped from mounting board 110 and are loaded in drum 71. Mounting-board support 111 includes first mounting-board support 111A and second mounting-board support 111B. For example, mounting-board supports 111A and 111B are provided in both end portions of a bottom surface of mounting board 110, respectively, in the longitudinal direction of mounting board 110. In other words, first mounting-board support 111A is provided in an end portion on a side opposite to a coupling portion of first mounting board 110A to second mounting board 110B. Second mounting-board support 111B is provided in an end portion on a side opposite to the coupling portion of second mounting board 110B to first mounting board 110A.

As illustrated in FIG. 2, clothes separating device 200 includes separator 210. Separator 210 has operational functions of gripping clothes in drum 71 (refer to FIG. 3) and separating, from the gripped clothes, another item of clothes entwined with the gripped clothes. Separator 210 includes first arm 220 and second arm 230 as gripping units, and force applying unit 240. In other words, separator 210 includes a plurality of the gripping units.

First arm 220 functions as a first gripping unit that is capable of gripping the clothes in drum 71. First arm 220 includes a pair of claws 221, claw rotating mechanism 222, extending-retracting portion 223, and support board 224. Claw 221 has a function of gripping clothes. For example, the pair of claws 221 is supported by claw rotating mechanism 222.

Claw rotating mechanism 222 has a function of causing the pair of claws 221 to rotate. Claw rotating mechanism 222 includes first rotary shaft 222A, second rotary shaft 222B, connection portion 222C, and rotary plate 222D. Connection portion 222C has a function of supporting first rotary shaft 222A and second rotary shaft 222B. First rotary shaft 222A is supported by connection portion 222C so as to be rotatable with respect to connection portion 222C. Second rotary shaft 222B is fixed to connection portion 222C, and is supported by rotary plate 222D so as to be rotatable with respect to rotary plate 222D.

First rotary shaft 222A has a function of changing a distance between tips of both claws 221. For example, with rotation of first rotary shaft 222A, the pair of claws 221 is coupled to first rotary shaft 222A via a gear or the like so as to rotate around first rotary shaft 222A in directions opposite to each other. The rotation of first rotary shaft 222A in the first direction causes the distance between tips of both claws 221 to be widened such that the pair of claws 221 is opened. Rotation of first rotary shaft 222A in the second direction opposite to the first direction causes the distance between tips of both claws 221 to be narrowed such that the pair of claws 221 is closed. Therefore, the rotation of first rotary shaft 222A changes strength of gripping of clothes by first arm 220.

Second rotary shaft 222B has a function of changing an orientation of the pair of claws 221. Rotation of second rotary shaft 222B causes connection portion 222C to rotate around second rotary shaft 222B, and the pair of claws 221 integrally rotates around second rotary shaft 222B. Therefore, the rotation of second rotary shaft 222B changes an angle of the pair of claws 221 with respect to rotary plate 222D.

Rotary plate 222D has a function of causing the pair of claws 221 to integrally rotate around a central axis of the rotary plate. For example, rotary plate 222D is supported by extending-retracting portion 223 so as to be rotatable around the central axis. The rotation of rotary plate 222D causes the pair of claws 221, connection portion 222C, and the like to integrally rotate around the central axis of rotary plate 222D.

Extending-retracting portion 223 has a function of causing the pair of claws 221 to shift in a vertical direction of clothes processing apparatus 1. Extending-retracting portion 223 is supported by support board 224 so as to be extendable and retractable with respect to support board 224. Extending-retracting portion 223 includes a wire (not illustrated), a reel (not illustrated), and cover 223A. The wire has functions of changing a distance between rotary plate 222D and support board 224 through pressing or pulling rotary plate 222D with respect to support board 224 and causing the pair of claws 221 to shift in the vertical direction. The reel has a function of winding or unwinding the wire. Rotation of the reel in the first direction causes the wire to be unwound, and thus the pair of claws 221 shifts downward. Rotation of the reel in the second direction opposite to the first direction causes the wire to be wound, and thus the pair of claws 221 shifts upward. Cover 223A has a function of covering the wire, the reel, and the like. For example, cover 223A is formed to have a bellows shape and extends and retracts along with the shift of the pair of claws 221. Support board 224 has a function of supporting extending-retracting portion 223 or the like.

Second arm 230 functions as a second gripping unit that is capable of gripping the clothes in drum 71. Second arm 230 has substantially the same configuration as first arm 220. Second arm 230 includes a pair of claws 231, claw rotating mechanism 232, extending-retracting portion 233, and support board 234. Claw rotating mechanism 232 includes first rotary shaft 232A, second rotary shaft 232B, connection portion 232C, and rotary plate 232D. Extending-retracting portion 233 includes a wire (not illustrated), a reel (not illustrated), and cover 233A.

In a case where, of clothes accommodated in drum 71, clothes are gripped, force applying unit 240 has a function of applying a force to at least another item of clothes CA such that the other clothes CA entwined with gripped clothes CH as the clothes gripped by arms 220 and 230 is separated from gripped clothes CH. For example, force applying unit 240 includes blower 91 (refer to FIG. 4) and mounting board 110 that configures a moving member that is capable of moving with respect to arms 220 and 230.

Blower 91, which functions as force applying unit 240, supplies, for example, the wind produced through rotation, to the other clothes CA. Specifically, gripped clothes CH approach air supply port 65 (refer to FIG. 4), and thereby the force of the wind supplied by blower 91 is applied to the other clothes CA. For example, mounting board 110 that functions as force applying unit 240 moves from a first position, for example, separated from arms 220 and 230 to a second position at which the mounting board is able to come into contact with gripped clothes CH. Therefore, a force produced due to the contact between gripped clothes CH and mounting board 110 is directly or indirectly applied to the other clothes CA.

Clothes transport device 100 further includes accommodation unit 120. Accommodation unit 120 has a function of accommodating clothes. For example, accommodation unit 120 is provided on a rear side of mounting board 110 in the frontward-rearward direction of clothes processing apparatus 1, and is attached to a surface corresponding to a side surface of an inner surface of main-body case 10 (refer to FIG. 1).

Clothes transport device 100 and clothes separating device 200 include support pipe 310 and imaging device 320 as configurational elements, which are common to both devices. Support pipe 310 has a function of supporting various types of elements which configure clothes transport device 100 and clothes separating device 200. Support pipe 310 includes first support pipe 311, a pair of second support pipes 312, third support pipe 313, a pair of fourth support pipes 314, and a pair of common pipes 315.

First support pipe 311 has a function of supporting mounting board 110. First support pipe 311 is a pipe that extends in the horizontal direction of clothes processing apparatus 1. A pair of mounting-board support 111 illustrated in FIG. 5 is fixed to first support pipe 311, and thereby mounting board 110 is supported by first support pipe 311.

Second support pipe 312 has a function of supporting first support pipe 311 in a shiftable manner in the frontward-rearward direction of clothes processing apparatus 1. The pair of second support pipe 312 is a pipe that extends in the frontward-rearward direction of clothes processing apparatus 1. First support pipe 311 shifts with respect to second support pipe 312, and thereby mounting board 110 shifts in the frontward-rearward direction of clothes processing apparatus 1.

Third support pipe 313 has a function of supporting arms 220 and 230 such that arms 220 and 230 individually shift in the horizontal direction of clothes processing apparatus 1.

Specifically, support board 224 of first arm 220 is supported by third support pipe 313 so as to be shiftable in the horizontal direction of clothes processing apparatus 1, and support board 234 of second arm 230 is supported by third support pipe 313 so as to be shiftable in the horizontal direction of clothes processing apparatus 1. Third support pipe 313 is a pipe that extends in the horizontal direction of clothes processing apparatus 1, and is provided above first support pipe 311.

Fourth support pipe 314 has a function of supporting third support pipe 313 in a shiftable manner in the frontward-rearward direction of clothes processing apparatus 1. The pair of fourth support pipes 314 is a pipe that extends in the frontward-rearward direction of clothes processing apparatus 1, and is provided above second support pipe 312. Third support pipe 313 shifts with respect to fourth support pipe 314, and thereby arms 220 and 230 shift in the frontward-rearward direction of clothes processing apparatus 1.

Common pipe 315 has a function of support pipes 312 and 314 such that second support pipe 312 and fourth support pipe 314 individually shift in the vertical direction of clothes processing apparatus 1. The pair of common pipes 315 is a pipe that extends in the vertical direction of clothes processing apparatus 1, and is fixed to the side surface of washing machine 40. The pair of second support pipes 312 is interlocked with and shifts with respect to common pipe 315, and thereby mounting board 110 shifts in the vertical direction of clothes processing apparatus 1. The pair of fourth support pipes 314 is interlocked with and shifts with respect to common pipe 315, and thereby arms 220 and 230 shift in the vertical direction of clothes processing apparatus 1.

Imaging device 320 has a function of imaging the inside of the drum 71 and the top view of mounting board 110. For example, imaging device 320 is a CCD (charge coupled device) camera. Imaging device 320 is attached to a surface corresponding to a top surface of an inner surface of main-body case 10. Imaging device 320 outputs imaged information to control device 330 of clothes processing apparatus 1 (refer to FIG. 6). Control device 330 controls mounting board 110 and arms 220 and 230, based on the information input from the imaging device 320.

Figure 6:
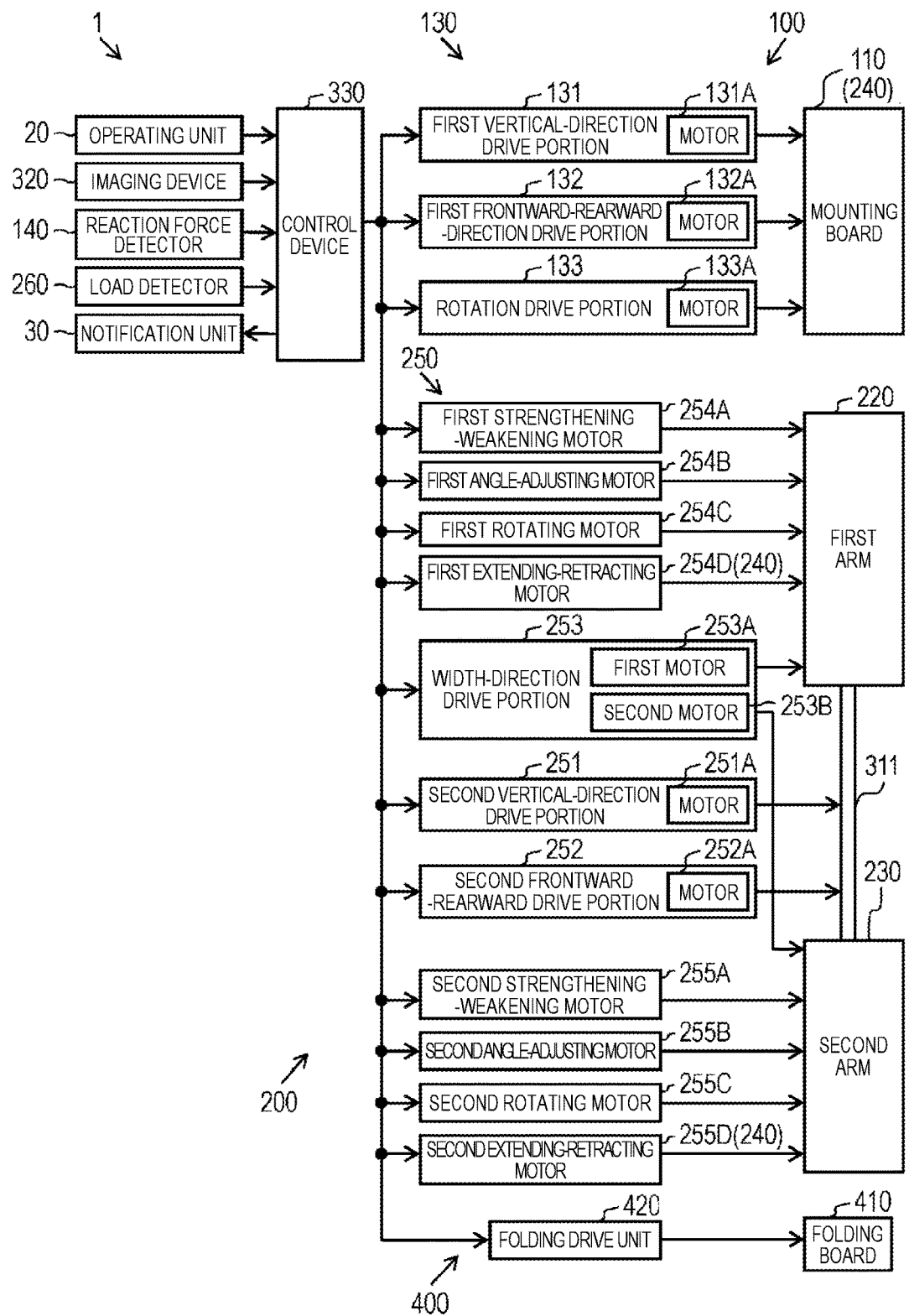
FIG. 6 is a block diagram of the clothes processing apparatus in FIG. 1.

FIG. 6 illustrates a relationship of electrical connection of clothes processing apparatus 1. Clothes transport device 100 further includes mounting-board drive unit 130. Mounting-board drive unit 130 has a function of causing mounting board 110 to shift. Clothes separating device 200 further includes arm drive unit 250. Arm drive unit 250 has a function of causing arms 220 and 230 to shift. Clothes transport device 100 and clothes separating device 200 further include control device 330 as a configurational element, which is common to both devices. Control device 330 has a function of controlling mounting-board drive unit 130, arm drive unit 250, and the like. Note that control device 330 is capable of controlling various types of elements that configure washing machine 40.

Mounting-board drive unit 130 includes first vertical-direction drive portion 131, first frontward-rearward-direction drive portion 132, and rotation drive portion 133. First vertical-direction drive portion 131 has a function of causing the pair of second support pipes 312 to shift along common pipe 315, thereby causing mounting board 110 to shift in the vertical direction. For example, first vertical-direction drive portion 131 includes a pair of ball screws (not illustrated) and a pair of motors 131A as actuators. The ball screw includes a screw shaft and a nut, and converts rotary motion of output shafts of motors 131A into translational motion in the vertical direction of clothes processing apparatus 1. For example, the screw shafts of the ball screws are provided in common pipes 315, and, for example, the nuts of the ball screws are provided in second support pipes 312. Control device 330 causes motors 131A to be synchronized with each other and to rotate, thereby causing mounting board 110 to shift in the vertical direction.

First frontward-rearward-direction drive portion 132 has a function of causing first support pipe 311 to shift along second support pipes 312, thereby causing mounting board 110 to shift in the frontward-rearward direction. For example, first frontward-rearward-direction drive portion 132 includes a pair of ball screws (not illustrated) and a pair of motors 132A as actuators. The ball screw includes a screw shaft and a nut, and converts rotary motion of output shafts of motors 132A into translational motion in the frontward-rearward direction of clothes processing apparatus 1. For example, the screw shafts of the ball screws are provided in second support pipes 312, and, for example, the nuts of the ball screws are provided in both end portions of first support pipe 311. Control device 330 causes motors 132A to be synchronized with each other and to rotate, thereby causing mounting board 110 to shift in the frontward-rearward direction.

Rotation drive portion 133 has a function of tilting mounting board 110 with respect to mounting-board support 111. Rotation drive portion 133 includes a rotary shaft (not illustrated) and motor 133A as an actuator. For example, the rotary shaft is fixed to the bottom surface of mounting board 110, and is supported by the pair of mounting-board support 111 in a rotatable manner with respect to mounting-board support 111. For example, an output shaft of motor 133A is coupled to the rotary shaft via a gear or the like. Control device 330 causes motor 133A to rotate, thereby tilting mounting board 110 with respect to mounting-board support 111.

Arm drive unit 250 includes second vertical-direction drive portion 251, second frontward-rearward-direction drive portion 252, and with drive portion 253. Arm drive unit 250 further includes first strengthening-weakening motor 254A, first angle adjusting motor 254B, first rotating motor 254C, first extending-retracting motor 254D, second strengthening-weakening motor 255A, second angle adjusting motor 255B, second rotating motor 255C, second extending-retracting motor 255D.

Second vertical-direction drive portion 251 has a function of causing the pair of fourth support pipes 314 to shift along common pipe 315, thereby causing arms 220 and 230 to shift in the vertical direction. For example, second vertical-direction drive portion 251 includes a pair of ball screws (not illustrated) and a pair of motors 251A as actuators. The ball screw includes a screw shaft and a nut, and converts rotary motion of output shafts of motors 251A into translational motion in the vertical direction of clothes processing apparatus 1. For example, the screw shafts of the ball screws are provided in common pipes 315, and, for example, the nuts of the ball screws are provided in fourth support pipes 314. Control device 330 causes motors 251A to be synchronized with each other and to rotate, thereby causing arms 220 and 230 to shift in the vertical direction.

Second frontward-rearward-direction drive portion 252 has a function of causing third support pipe 313 to shift along fourth support pipes 314, thereby causing arms 220 and 230 to shift in the frontward-rearward direction. For example, second frontward-rearward-direction drive portion 252 includes a pair of ball screws (not illustrated) and a pair of motors 252A as actuators. The ball screw has a screw shaft and a nut, and converts rotary motion of output shafts of motors 252A into translational motion in the frontward-rearward direction of clothes processing apparatus 1. For example, the screw shafts of the ball screws are provided in fourth support pipes 314, and, for example, the nuts of the ball screws are provided in both end portions of third support pipe 313. Control device 330 causes motors 252A to be synchronized with each other and to rotate, thereby causing arms 220 and 230 to shift in the frontward-rearward direction.

Width-direction drive portion 253 has a function of causing arms 220 and 230 to individually shift along third support pipe 313. For example, width-direction drive portion 253 includes a pair of ball screws (not illustrated) and first motor 253A and second motor 253B as actuators. The ball screws include screw shafts and nuts, respectively, and convert rotary motion of output shafts of motors 253A and 253B into translational motion in the horizontal direction of clothes processing apparatus 1.

For example, a screw shaft of one ball screw is provided in a part on the left side of third support pipe 313 in the horizontal direction of clothes processing apparatus 1. For example, a nut of one ball screw is provided on support board 224 of first arm 220. For example, an output shaft of motor 253A is coupled to one screw shaft of the ball screw. Control device 330 causes first motor 253A to rotate, thereby causing first arm 220 to shift in the horizontal direction.

For example, the screw shaft of the other ball screw is provided in a part on the right side of third support pipe 313 in the horizontal direction of clothes processing apparatus 1. For example, the nut of the other ball screw is provided on support board 234 of second arm 230. For example, an output shaft of second motor 253B is coupled to the screw shaft of the other ball screw. Control device 330 causes second motor 253B to rotate, thereby causing second arm 230 to shift in the horizontal direction. In other words, control device 330 causes at least one of first motor 253A and second motor 253B to rotate, thereby changing a distance of width between first arm 220 and second arm 230.

First strengthening-weakening motor 254A has a function of changing a distance between tips of both claws 221 of first arm 220, thereby adjusting strength of gripping of clothes by first arm 220. For example, an output shaft of first strengthening-weakening motor 254A is coupled to first rotary shaft 222A of first arm 220. Therefore, control device 330 causes first strengthening-weakening motor 254A to rotate, thereby first rotary shaft 222A rotates, then the distance between the tips of both claws 221 changes, and the strength of gripping of clothes by first arm 220 is adjusted. Note that second strengthening-weakening motor 255A has substantially the same configuration as first strengthening-weakening motor 254A, and an output shaft thereof is coupled to first rotary shaft 232A of second arm 230.

First angle adjusting motor 254B has a function of adjusting an angle between the pair of claws 221 and rotary plate 222D of first arm 220. For example, an output shaft of first angle adjusting motor 254B is coupled to second rotary shaft 222B of first arm 220. Therefore, control device 330 causes first angle adjusting motor 254B to rotate, and thereby second rotary shaft 222B rotates and the angle between rotary plate 222D and the pair of claws 221 is adjusted. Note that second angle adjusting motor 255B has substantially the same configuration as first angle adjusting motor 254B, and an output shaft thereof is coupled to second rotary shaft 232B of second arm 230.

First rotating motor 254C has a function of causing the pair of claws 221 of first arm 220 to integrally rotate around the central axis of rotary plate 222D. For example, an output shaft of first rotating motor 254C is coupled to a rotary shaft (not illustrated) provided on the central axis of rotary plate 222D. Therefore, control device 330 causes first rotating motor 254C to rotate, and thereby a rotary shaft thereof and rotary plate 222D rotate and the pair of claws 221 integrally rotates around the central axis of rotary plate 222D. Note that second rotating motor 255C has substantially the same configuration as first rotating motor 254C, and an output shaft thereof is coupled to a rotary shaft (not illustrated) provided on the central axis of rotary plate 232D of second arm 230.

First extending-retracting motor 254D has a function of causing extending-retracting portion 223 of first arm 220 to be extended or retracted, and thereby causing the pair of claws 221 to shift in the vertical direction of clothes processing apparatus 1. For example, an output shaft of first extending-retracting motor 254D is coupled to for example, the rotary shaft of the reel of extending-retracting portion 223. Therefore, control device 330 causes first extending-retracting motor 254D to rotate, thereby the reel rotates and the pair of claws 221 shifts in the vertical direction. Note that second extending-retracting motor 255D has substantially the same configuration as first extending-retracting motor 254D, and an output shaft thereof is coupled to the rotary shaft of the reel of second arm 230.

Force applying unit 240 further includes first extending-retracting motor 254D. For example, control device 330 controls first extending-retracting motor 254D such that gripped clothes CH moves in the vertical direction, thereby causing first arm 220 to vibrate. Therefore, a force is applied to the other clothes CA due to the vibration of first arm 220. Note that force applying unit 240 also includes second extending-retracting motor 255D.

Control device 330 executes the following operation, thereby causing first arm 220 to grip the clothes. First, control device 330 controls motors 251A, 252A, and 253A such that first arm 220 is disposed at a corresponding position right above clothes which are wanted to be gripped, at the lowermost position in the vertical direction of clothes processing apparatus 1. Then, control device 330 controls first extending-retracting motor 254D, thereby causing claws 221 of first arm 220 to approach the clothe. Then, control device 330 controls first strengthening-weakening motor 254A such that first rotary shaft 222A rotates in the first direction, and the pair of claws 221 is opened. Then, control device 330 further controls first extending-retracting motor 254D such that the clothes are disposed between the pair of claws 221. Control device 330 controls first strengthening-weakening motor 254A such that first rotary shaft 222A rotates in the second direction, and the pair of claws 221 is closed. Through the operation, the clothes are gripped by first arm 220.

In addition, after the clothes are gripped by first arm 220, first strengthening-weakening motor 254A is controlled such that first rotary shaft 222A rotates in the first direction, and thereby the clothes are separated from first arm 220. Note that an operation of gripping the clothes by second arm 230 is substantially the same as that of first arm 220.

Clothes transport device 100 further includes two reaction force detector 140 and arms 220 and 230. Reaction force detector 140 has a function of detecting reaction force acting on claws 221 and 231 when arms 220 and 230 grip the clothes with predetermined strength. For example, reaction force detector 140 is a strain sensor. For example, one reaction force detector 140 is provided on claw 221 of first arm 220. For example, the other reaction force detector 140 is provided on claw 231 of second arm 230. Reaction force detectors 140 output, to control device 330, information related to detected reaction force.

Control device 330 controls arm drive unit 250, based on the information input from reaction force detectors 140. Specifically, before mounted clothes CS as the clothes mounted on mounting board 110 are loaded in drum 71, control device 330 causes arms 220 and 230 to grip the clothes. Then, control device 330 causes the clothes gripped by arms 220 and 230 to move from mounting board 110 to accommodation unit 120 in a case where the reaction force detected by reaction force detector 140 is smaller than a predetermined reaction force. On the other hand, control device 330 causes the clothes gripped by arms 220 and 230 to remain on mounting board 110 in a case where the reaction force detected by reaction force detector 140 is larger than or equal to the predetermined reaction force. In other words, control device 330 distinguishes between mounted clothes CS, based on the thickness of clothes.

After control device 330 distinguishes between all of mounted clothes CS, the control device causes mounted clothes CS remaining on mounting board 110 to be loaded in drum 71. After washing and drying of all of the clothes loaded in drum 71 are ended and the clothes are unloaded from drum 71, control device 330 causes arms 220 and 230 to return, to mounting board 110, clothes accommodated in accommodation unit 120 and to load the clothes into drum 71. As described above, laundry is divided into two groups depending on the thickness of the clothes and washing or the like is performed, and thereby the clothes subjected to washing, drying, and the like are unlikely to be intertwined with each other.

Clothes separating device 200 further includes two load detectors 260. Load detector 260 has a function of detecting a load acting on arms 220 and 230 when arms 220 and 230 grip and lift the clothes in drum 71. For example, load detector 260 is a load sensor that is capable of detecting a load applied to the wire when the wires of extending-retracting portions 223 and 233 are wound around the reel. For example, one load detector 260 is provided on the wire of first arm 220. For example, the other load detector 260 is provided on the wire of second arm 230. Load detectors 260 output information related to the detected load to control device 330.

Control device 330 controls arm drive unit 250, based on the information input from load detectors 260. Specifically, control device 330 controls arm drive unit 250 such that arms 220 and 230 that grip the clothes are stopped in a case where the load detected by load detector 260 is higher than or equal to a predetermined load. Control device 330 causes notification unit 30 to output information indicating abnormality.

Control device 330 controls mounting-board drive unit 130 and arm drive unit 250, based on the information input from the imaging device 320. Specifically, after mounted clothes CS are loaded in drum 71, control device 330 causes imaging device 320 to image the top view of mounting board 110. In a case where control device 330 determines that clothes are present on mounting board 110, based on the image information acquired by imaging device 320, the control device again controls rotation drive portion 133 such that the clothes are loaded in drum 71. In addition, in a case where control device 330 causes imaging device 320 to image the inside of drum 71 and determines that clothes are present in drum 71, based on the image information, the control device controls arm drive unit 250 such that arms 220 and 230 grip the clothes in drum 71.

Folding device 400 includes folding board 410, folding drive unit 420, and control device 330. Folding board 410 has a function of folding the clothes mounted on folding board 410. Folding board 410 is able to shift in the vertical direction of clothes processing apparatus 1. Folding drive unit 420 has a function of driving folding board 410 such that folding board 410 folds the clothes. Therefore, control device 330 controls folding drive unit 420, and thereby the clothes mounted on folding board 410 are folded. Note that Japanese Patent No. 5299934 discloses a specific configuration and operations of folding device 400.

Control device 330 executes a plurality of types of control, based on an operation of operating unit 20. Examples of the plurality of types of control include loading control, washing-drying control, unloading control, straightening control, and folding control. Control device 330 executes the plurality of types of control, and thereby washing, drying, and the like are performed on the plurality of clothes loaded from clothes loading unit 11, and then the plurality of clothes are folded for each item of clothes.

Figure 7:
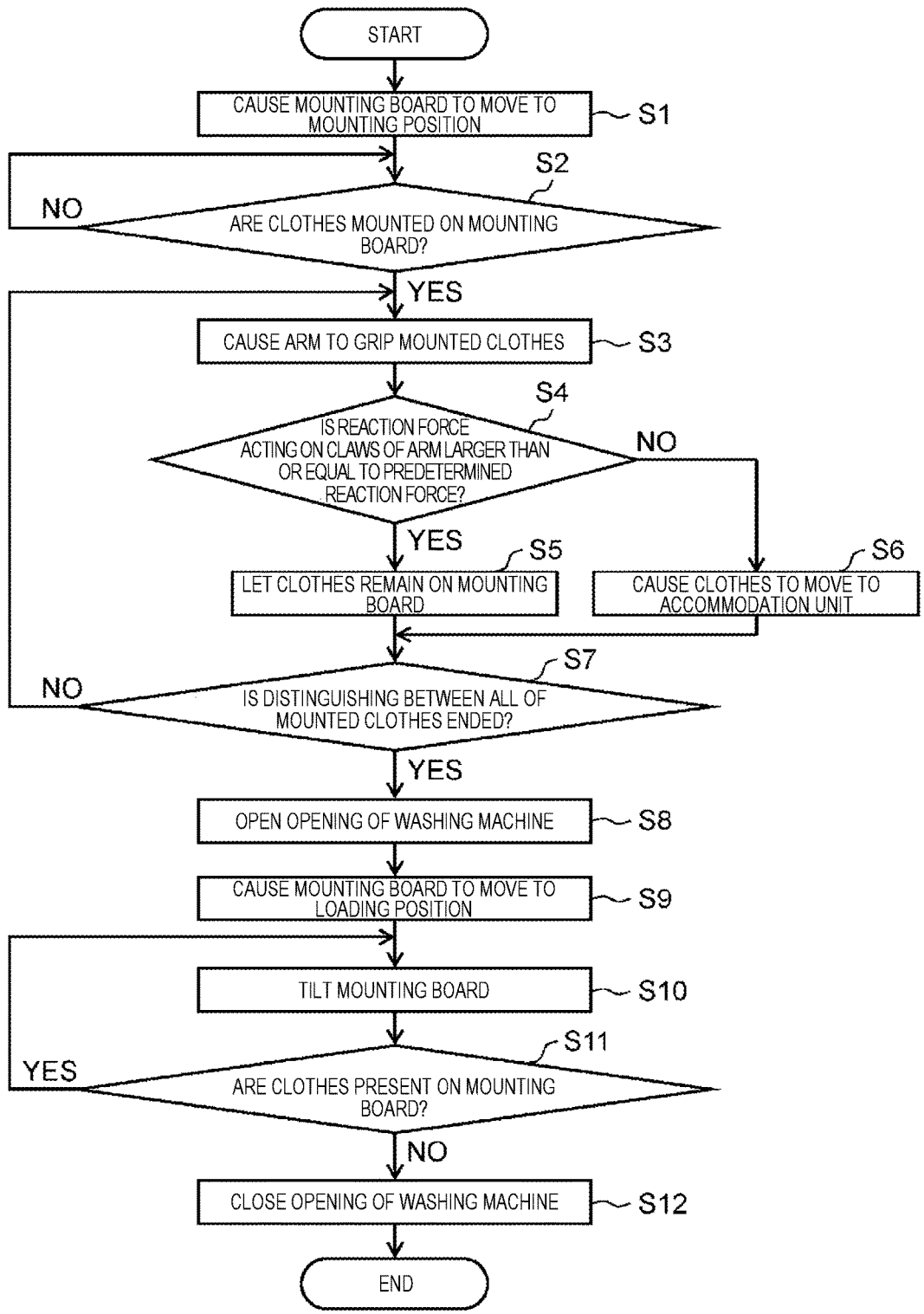
FIG. 7 is a flowchart of loading control executed by the clothes processing apparatus.

FIG. 7 is an example of a flowchart of loading control executed by control device 330. Control device 330 executes the loading control, based on the operation of operating unit 20. Note that mounting board 110 and arms 220 and 230 takes up initial positions before the loading control is executed. The initial position of mounting board 110 is the lowermost position in a range, in which mounting board 110 is capable of moving, in the vertical direction of clothes processing apparatus 1, and the rearmost position in the frontward-rearward direction of clothes processing apparatus 1. The initial positions of arms 220 and 230 are the uppermost position in a range, in which arms 220 and 230 are capable of moving, in the vertical direction of clothes processing apparatus 1, the rearmost position in the frontward-rearward direction of clothes processing apparatus 1, and an intermediate position in the horizontal direction of clothes processing apparatus 1.

In Step S1, control device 330 controls mounting-board drive unit 130, thereby causing mounting board 110 to move to a mounting position. For example, the mounting position of mounting board 110 is a position below clothes loading unit 11 in the vertical direction of clothes processing apparatus 1, and the foremost position in the frontward-rearward direction of clothes processing apparatus 1. The cover of clothes loading unit 11 is opened, and plurality of clothes from clothes loading unit 11 are mounted on mounting board 110. Then, the cover of clothes loading unit 11 is closed.

In Step S2, control device 330 determines whether or not the clothes are mounted on mounting board 110. Specifically, control device 330 determines whether or not the clothes are mounted on mounting board 110, for example, based on the operation of operating unit 20 and an opening-closing state of the cover of clothes loading unit 11. In other words, control device 330 determines that the clothes are mounted on mounting board 110, when the cover of clothes loading unit 11 is closed and operating unit 20 is operated. In Step S2, in a case where the control device determines that the clothes are not mounted on mounting board 110, a process in Step S2 is again executed. On the other hand, in Step S2, in the case where the control device determines that the clothes are mounted on mounting board 110, a process in Step S3 is executed.

In Step S3, control device 330 controls arm drive unit 250, thereby causing arms 220 and 230 to grip mounted clothes CS as the clothes mounted on mounting board 110, with the predetermined strength for each item of the clothes.

In Step S4, control device 330 determines whether or not the reaction force acting on claws 221 and 231 of arms 220 and 230, which grip the clothes, is larger than or equal to the predetermined reaction force. Specifically, control device 330 determines whether or not the reaction force detected by reaction force detectors 140 corresponding to arms 220 and 230, which grip the clothes, is larger than or equal to the predetermined reaction force. In Step S4, in a case where the control device determines that the reaction force detected by reaction force detectors 140 is larger than or equal to the predetermined reaction force, a process in Step S5 is executed. In Step S5, control device 330 controls arm drive unit 250, thereby causing the clothes gripped by arms 220 and 230 to remain on mounting board 110.

On the other hand, in Step S4, in a case where the control device determines that the reaction force detected by reaction force detectors 140 is smaller than the predetermined reaction force, a process in Step S6 is executed. In Step S6, control device 330 controls arm drive unit 250, thereby causing the clothes gripped by arms 220 and 230 to move from mounting board 110 to accommodation unit 120.

In Step S7, control device 330 determines whether or not distinguishing between all of the mounted clothes CS is ended. Specifically, control device 330 determines that whether or not the reaction force detected by reaction force detector 140 is maintained to be larger than or equal to the predetermined reaction force, or the distinguishing between all of the mounted clothes CS is ended, based on the image information or the like acquired by imaging device 320. In Step S7, in a case where the control device determines that the distinguishing between all of mounted clothes CS is ended, the flow returns to the process in Step S3. In Step S7, in a case where the control device determines that the distinguishing between all of mounted clothes CS is ended, a process in Step S8 is executed.

In Step S8, control device 330 controls main-body lid 52, outer-tub lid 62, and drum lid 72, thereby causing all of openings 51A, 61A, and 71A to be opened and opening 40A of washing machine 40 to be opened.

In Step S9, control device 330 controls mounting-board drive unit 130, thereby causing mounting board 110 to move to a loading position. For example, the loading position of mounting board 110 is a position at which mounting board 110 is tilted with respect to mounting-board support 111, and thereby mounted clothes CS are dropped from mounting board 110 and are loaded in drum 71. Specifically, control device 330 causes mounting board 110 to move to the lowermost position in the vertical direction of clothes processing apparatus 1, and the rearmost position in the frontward-rearward direction of clothes processing apparatus 1.

In Step S10, control device 330 controls mounting-board drive unit 130, thereby causing mounting board 110 to be tilted with respect to mounting-board support 111. Mounted clothes CS are dropped from mounting board 110, passes through opening 40A of washing machine 40, and loaded in drum 71.

In Step S11, control device 330 causes imaging device 320 to image the top view of mounting board 110 after the tilt of mounting board 110 with respect to mounting-board support 111 is cancelled, and determines whether or not clothes are present on mounting board 110, based on the image information. In Step S11, in a case where the control device determines that the clothes are presented on mounting board 110, the flow returns to the process in Step S10. On the other hand, in Step S11, in the case where the control device determines that the clothes are not presented on mounting board 110, a process of Step S12 is executed. Note that, in a case where the processes in Step S10 and Step S11 are repeated a predetermined number of times, control device 330 causes notification unit 30 to output information indicating abnormality. Control device 330 stops the loading control until the abnormality is removed.

In Step S12, control device 330 controls main-body lid 52, outer-tub lid 62, and drum lid 72, thereby causing all of openings 51A, 61A, and 71A to be closed and opening 40A of washing machine 40 to be closed. Control device 330 ends the loading control including the processes in Step S1 to Step S12, and proceeds to washing and drying control.

Control device 330 executes the following washing and drying control. First, control device 330 determines whether or not a total weight of the clothes accommodated in drum 71 is heavier than or equal to a predetermined weight. Specifically, control device 330 causes drum motor 82 to rotate in the first direction and the second direction a plurality of times, and determines whether or not an appropriate amount of clothes is accommodated in drum 71, based on a load on drum motor 82 at this time. In a case where the control device determines that the total weight of clothes accommodated in drum 71 is heavier than or equal to the predetermined weight, control device 330 causes notification unit 30 to output information indicating abnormality. Control device 330 stops the washing and drying control until the abnormality is removed. On the other hand, in a case where the control device determines that the total weight of clothes accommodated in drum 71 is lighter than the predetermined weight, the next process is executed.

Then, control device 330 causes an amount of detergent, which is suitable for the total weight of clothes accommodated in drum 71, of the detergent which is loaded from detergent loading unit 12 in advance and stored in the detergent storage portion, to be supplied to water passage 53A from the detergent storage portion. Control device 330 causes an amount of water, which is suitable for the total weight of clothes accommodated in drum 71, to be supplied along with the detergent into outer tub 61 via water passage 53A.

Then, control device 330 controls drum motor 82, dryer 90, and the like, based on preset conditions, and causes the washing, spin-drying, and drying to be performed on the plurality of clothes accommodated in drum 71. In the second half of the drying process, control device 330 causes drum motor 82 to repeatedly rotate in the first direction and the second direction so as to disentangle the plurality of clothes from one another. Then, control device 330 ends the washing and drying control and proceeds to unloading control. Note that specific operations of processes related to washing, spin-drying, drying, and the like by washing machine 40 are disclosed, for example, in Japanese Patent Unexamined Publication No. 2006-255195.

Figure 8:
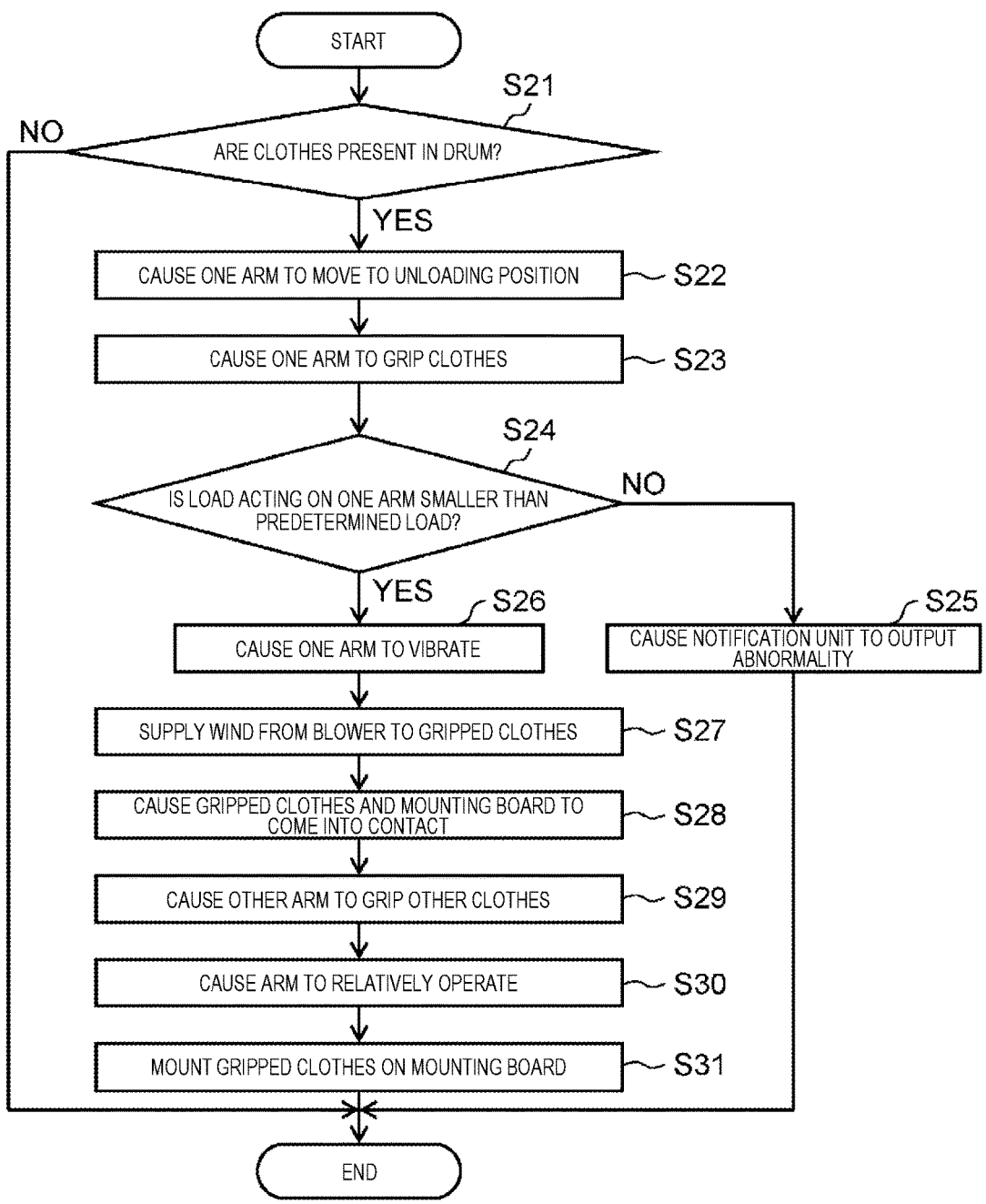
FIG. 8 is a flowchart of unloading control executed by the clothes processing apparatus.

FIG. 8 is an example of a flowchart of unloading control executed by control device 330. For example, control device 330 causes opening 40A of washing machine 40 to be opened after the washing and drying control is ended, and then executes the unloading control.

In Step S21, control device 330 causes imaging device 320 to image the inside of drum 71, and determines whether or not the clothes are present in drum 71, based on the image information. In Step S21, in a case where the control device determines that the clothes are not present in drum 71, control on clothes processing apparatus 1 is ended. On the other hand, in Step S21, in a case where the control device determines that the clothes are presented in drum 71, a process of Step S22 is executed.

In Step S22, control device 330 recognizes positions of the clothes accommodated in drum 71 from the image information acquired by imaging device 320 in the process in Step S21, and controls arm drive unit 250, thereby causing one corresponding arm 220 or 230 to move to unloading positions. For example, the unloading positions of arms 220 and 230 are the lowermost position in the vertical direction of clothes processing apparatus 1, and the corresponding position right above the recognized clothes.

In Step S23, control device 330 controls arm drive unit 250, thereby causing arms 220 and 230 to grip the clothes.

In Step S24, control device 330 controls arm drive unit 250, thereby causing one arm 220 or 230 to lift gripped clothes CH as the clothes gripped by the arm, and determines whether or not the load acting on the one arm 220 or 230 is lower than the predetermined load. Specifically, control device 330 determines whether or not the load detected by load detector 260 corresponding to the one arm 220 or 230 is lower than the predetermined load. In Step S24, in a case where the control device determines that the load detected by load detector 260 is higher than or equal to the predetermined load, a process in Step S25 is executed. In Step S25, control device 330 causes notification unit 30 to output information indicating abnormality. Then, control device 330 ends the unloading control and again executes unloading control after the abnormality is removed.

On the other hand, in Step S24, in a case where the control device determines that the load detected by load detector 260 is lower than the predetermined load, a process in Step S26 is executed. In Step S26, control device 330 controls extending-retracting motor 254D or 255D corresponding to the one arm 220 or 230, thereby causing one arm 220 or 230 to vibrate such that gripped clothes CH moves in the vertical direction. In this manner, in a case where the other clothes CA is entwined with gripped clothes CH, a force produced from the vibration of arm 220 or 230 is applied to the other clothes CA.

In Step S27, control device 330 controls arm drive unit 250 such that gripped clothes CH approach air supply port 65 of outer tub 61, and controls fan motor 92, thereby causing blower 91 to rotate. Rotation of blower 91 causes wind to be supplied from air supply port 65 toward gripped clothes CH. In this manner, in a case where the other clothes CA are entwined with gripped clothes CH, the force of wind supplied from blower 91 is applied to the other clothes CA.

In Step S28, control device 330 controls arm drive unit 250 such that gripped clothes CH and mounting board 110 take up substantially the same position in the vertical direction of clothes processing apparatus 1. Control device 330 controls mounting-board drive unit 130 such that mounting board 110 moves from the first position separated from arms 220 and 230 to the second position at which the mounting board is able to come into contact with gripped clothes CH. In this manner, in a case where the other clothes CA are entwined with gripped clothes CH, the force produced from the contact between gripped clothes CH and mounting board 110 is directly or indirectly applied to the other clothes CA.

In Step S29, control device 330 controls arm drive unit 250, thereby causing the other arm 220 or 230, which does not grip clothes, to approach the one arm 220 or 230 by which the clothes are gripped. Control device 330 causes the other arm 220 or 230 to grip the other clothes CA which are entwined with gripped clothes CH.

In Step S30, control device 330 controls width drive unit 253, thereby causing arms 220 and 230 to relatively operate such that the other clothes CA is separated from gripped clothes CH. In this manner, gripped clothes CH and the other clothes CA are pulled apart from each other. For example, control device 330 controls arm drive unit 250, thereby causing the other clothes CA gripped by the other arm 220 or 230 to return into drum 71.

Note that, in Step S30, in a case where control device 330 determines that the load detected by load detector 260 is higher than or equal to the predetermined load, a process in Step S30 is ended. This is considered as a case where, when no other clothes CA are entwined with gripped clothes CH, or the like, gripped clothes CH is gripped by the other arm 220 or 230.

In Step S31, control device 330 controls arm drive unit 250, thereby causing gripped clothes CH to be mounted on mounting board 110. As described above, the clothes accommodated in drum 71 are unloaded by arms 220 and 230 from the inside of drum 71, and the unloaded clothes are mounted on mounting board 110. Control device 330 ends the unloading control including the processes in Step S21 to Step S31, and proceeds to the straightening control.

Then, control device 330 executes the straightening control. For example, control device 330 causes imaging device 320 to image the clothes mounted on mounting board 110, and controls arm drive unit 250 such that the clothes are straightened by arms 220 and 230, based on the information. Control device 330 ends the straightening control and proceeds to folding control.

Then, control device 330 executes the folding control. First, control device 330 controls arm drive unit 250, thereby causing arms 220 and 230 to grip the straightened clothes and to mount the clothes on folding board 410. Then, control device 330 controls folding drive unit 420 such that the clothes mounted on folding board 410 are folded by folding board 410. Then control device 330 causes the folded clothes to be transported outside clothes processing apparatus 1. Control device 330 ends the folding control and again proceeds to unloading control. In the unloading control of Step S21, the unloading control, the straightening control, and the folding control are repeatedly executed until the control device determines that no clothes are present in drum 71. Note that Japanese Patent No. 5299934 discloses specific operations of the straightening control and folding control.

Examples of Operations of Clothes Processing Apparatus 1 are Described with Reference to FIGS. 9 to 15.

A user who uses clothes processing apparatus 1 operates operating unit 20, thereby setting a power supply of clothes processing apparatus 1 to ON. The power supply of clothes processing apparatus 1 is set to ON, and thereby the control device 330 executes, for example, the following checking control.

First, control device 330 compares detection values of various types of sensors or the like, which are installed in clothes processing apparatus 1, to standard values corresponding to the various types of sensors. For example, the standard values are stored in a memory of control device 330 in advance. In a case where control device 330 determines that an error between the detection value and the standard value of the sensor or the like is large, the control device causes notification unit 30 to output information indicating abnormality. Control device 330 stops the checking control until the abnormality is removed. On the other hand, in a case where control device 330 determines that the error between the detection value and the standard value of the sensor or the like is small, the next process is executed.

Then, control device 330 compares positions to a reference point of mounting board 110 and arms 220 and 230. For example, the reference point is a point of washing machine 40 that is fixed to main-body case 10. Specifically, control device 330 causes imaging device 320 to image mounting board 110, arms 220 and 230, and the reference point, and determines whether or not a distance between mounting board 110 and the reference point, based on coordinates thereof, and a distance between arms 220 and 230 and the reference point, based on coordinates thereof, are within a predetermined range. In other words, the control device determines whether or not mounting board 110 and arms 220 and 230 are placed at the initial position.

In a case where control device 330 determines that the distances between mounting board 110 and arms 220 and 230 and the reference point are not within the predetermined range, the control device causes notification unit 30 to output information indicating abnormality. Control device 330 stops the checking control until the abnormality is removed. On the other hand, in a case where control device 330 determines that the distances between mounting board 110 and arms 220 and 230 and the reference point are within the predetermined range, the control device ends the checking control.

The user who uses clothes processing apparatus 1 operates operating unit 20, thereby, for example, selecting a course related to washing. The course related to washing is selected, and thereby control device 330 executes the loading control illustrated in FIGS. 9 and 10. Note that FIGS. 9 and 10 are sectional views in the frontward-rearward direction of clothes processing apparatus 1, and a part of elements that configure clothes processing apparatus 1 are omitted.

Figure 9:
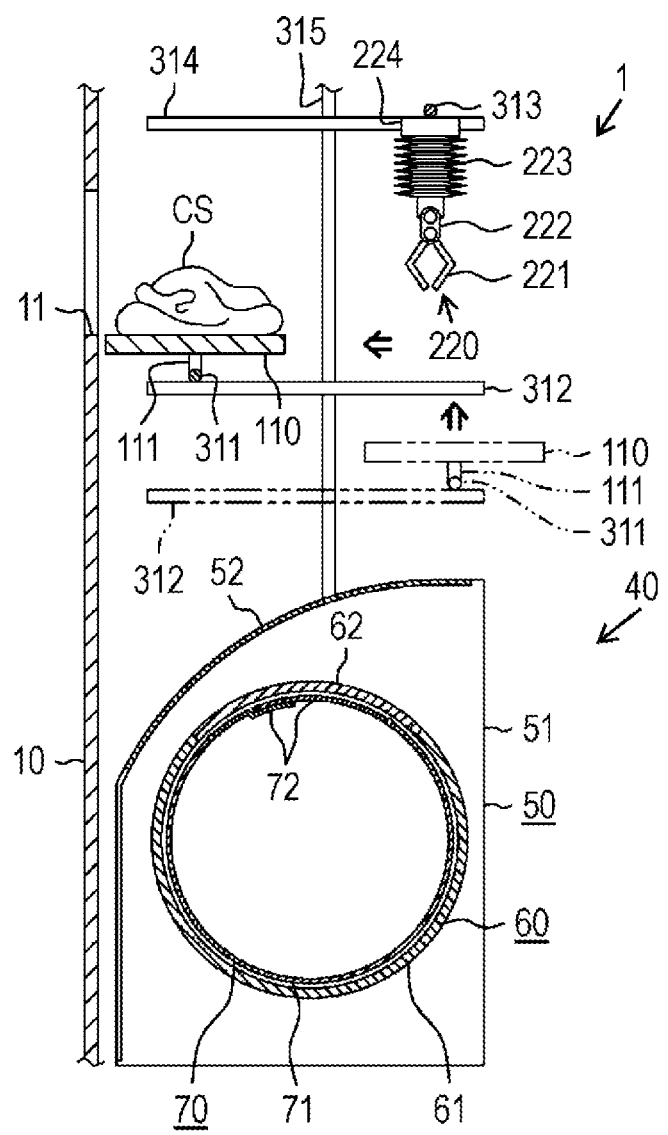
FIG. 9 is an operation diagram illustrating a first operation of the clothes processing apparatus in FIG. 2.

As illustrated in FIG. 9, control device 330 first executes a first operation. In other words, control device 330 causes mounting board 110 to move to the mounting position. Specifically, control device 330, first, controls first vertical-direction drive portion 131, thereby causing mounting board 110 to move to a position along the bottom portion of clothes loading unit 11. Then, control device 330 controls first frontward-rearward-direction drive portion 132, thereby causing mounting board 110 to move to the foremost position in the frontward-rearward direction of clothes processing apparatus 1.

After the first operation is executed by control device 330, the user mounts a plurality of clothes on mounting board 110 from clothes loading unit 11. An example of the clothes is a T-shirt. Then, control device 330 causes arms 220 and 230 to grip mounted clothes CS mounted on mounting board 110 with the predetermined strength, and distinguishes between mounted clothes CS, based on the reaction force detected by reaction force detector 140.

Figure 10:
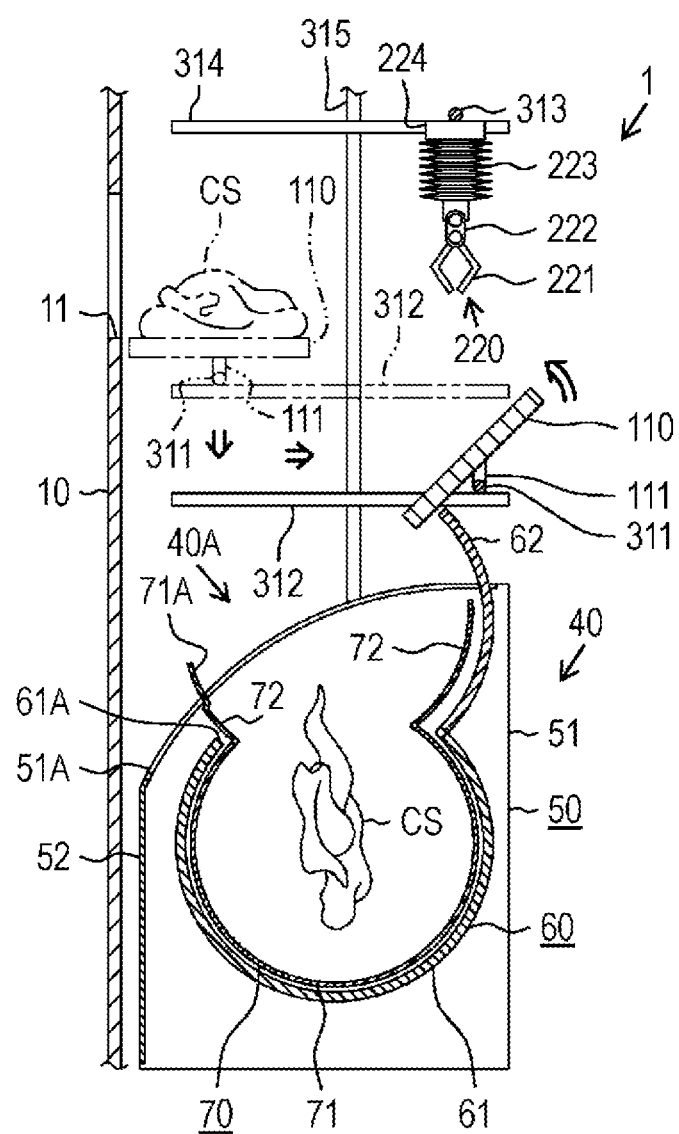
FIG. 10 is an operation diagram illustrating a second operation of the clothes processing apparatus in FIG. 2.

As illustrated in FIG. 10, control device 330 then executes a second operation. In other words, control device 330 causes opening 40A of washing machine 40 to be opened, and mounting board 110 to move to the loading position and to be tilted with respect to mounting-board support 111. Specifically, control device 330 first controls lids 52, 62, and 72, thereby opening all of openings 51A, 61A, and 71A. Then, control device 330 controls first vertical-direction drive portion 131, thereby causing mounting board 110 to move to the lowermost position in the vertical direction of clothes processing apparatus 1. Then, control device 330 controls first frontward-rearward-direction drive portion 132, thereby causing mounting board 110 to move to the rearmost position in the frontward-rearward direction of clothes processing apparatus 1. Then, control device 330 controls rotation drive portion 133, thereby causing mounting board 110 to be tilted with respect to mounting-board support 111. Mounting board 110 is tilted with respect to mounting-board support 111, and thereby mounted clothes CS are dropped from mounting board 110 and are loaded in drum 71.

After control device 330 executes the second operation, the control device causes imaging device 320 to image the top view of mounting board 110, and determines whether or not the clothes are present on mounting board 110, based on the image information. Control device 330 closes opening 40A of washing machine 40 and end the loading control.

After ending the loading control, control device 330 executes the washing and drying control. Control device 330 causes the washing, spin-drying, and drying to be performed on the plurality of clothes accommodated in drum 71, and ends the washing and drying control.

Figure 11:
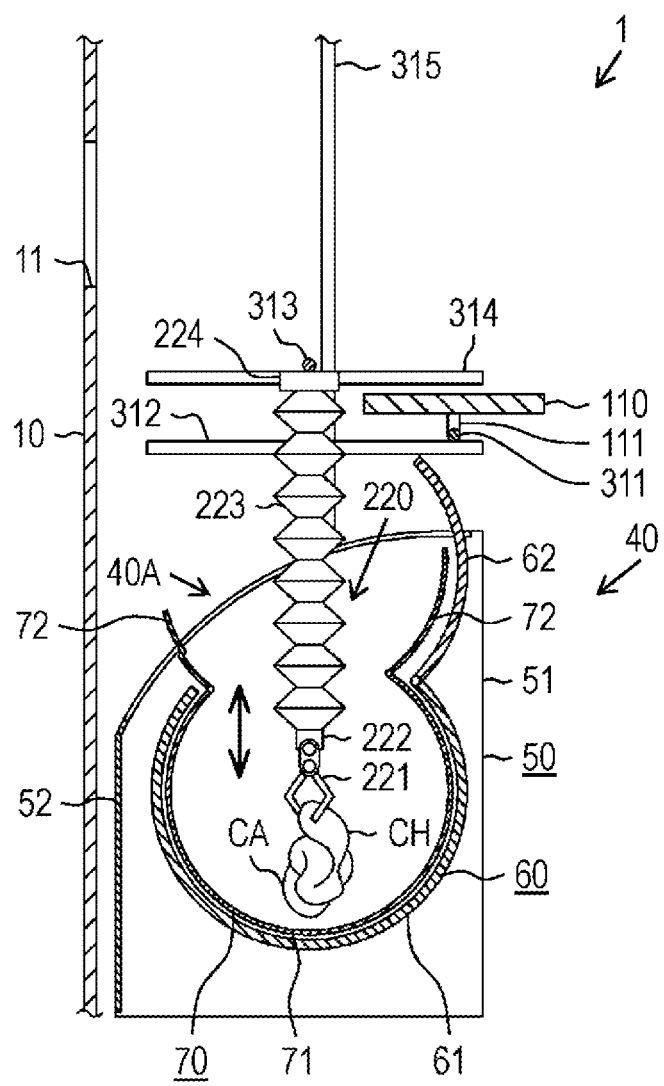
FIG. 11 is an operation diagram illustrating a third operation of the clothes processing apparatus in FIG. 2.
Figure 12:
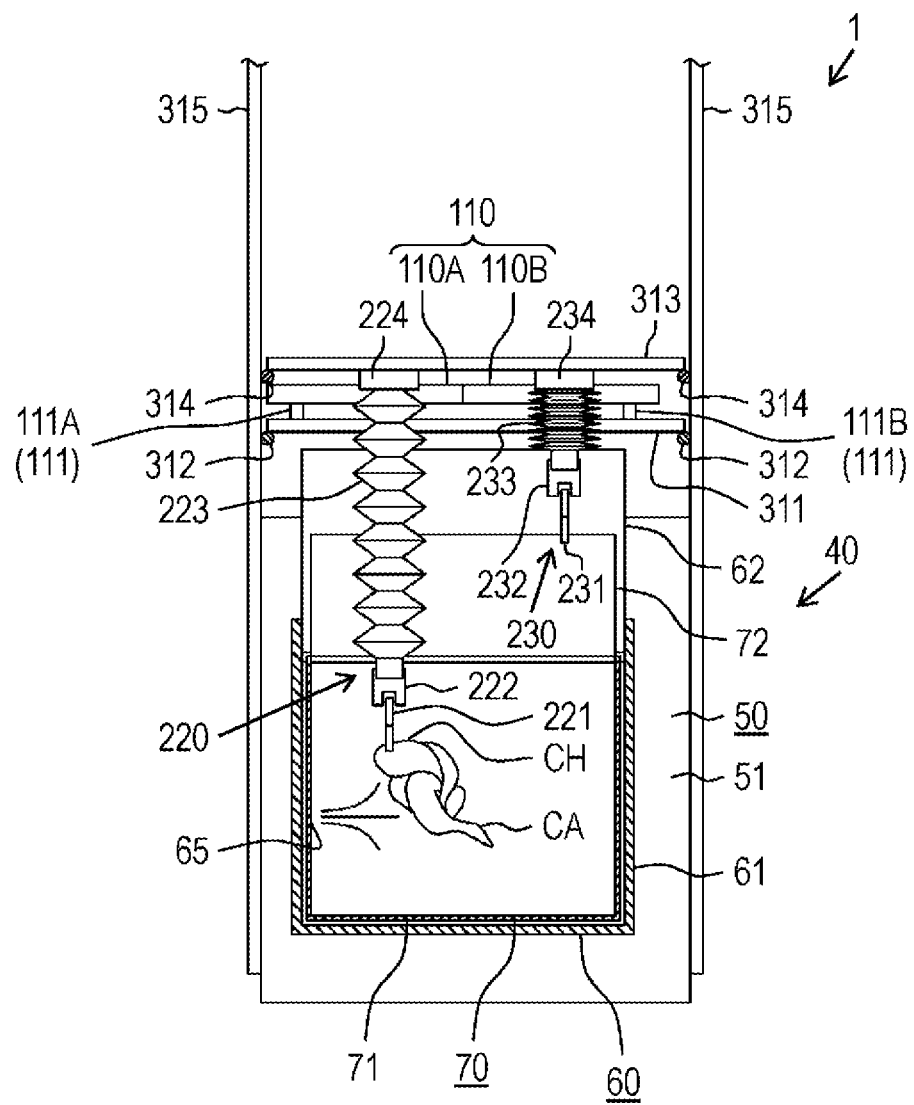
FIG. 12 is an operation diagram illustrating a fourth operation of the clothes processing apparatus in FIG. 2.
Figure 13:
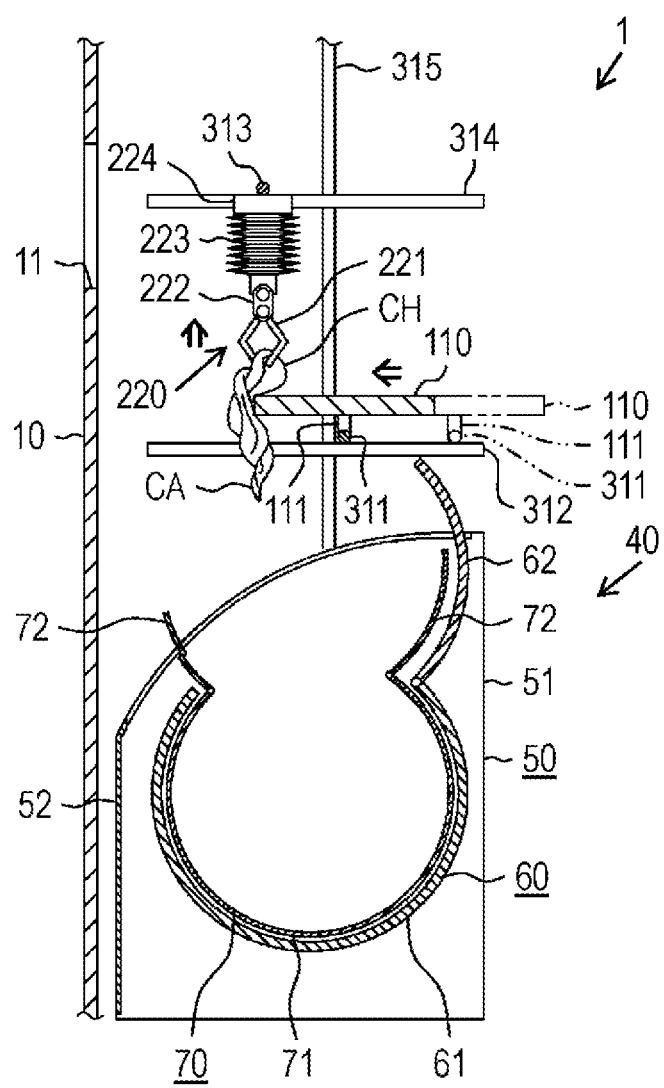
FIG. 13 is an operation diagram illustrating a fifth operation of the clothes processing apparatus in FIG. 2.
Figure 14:
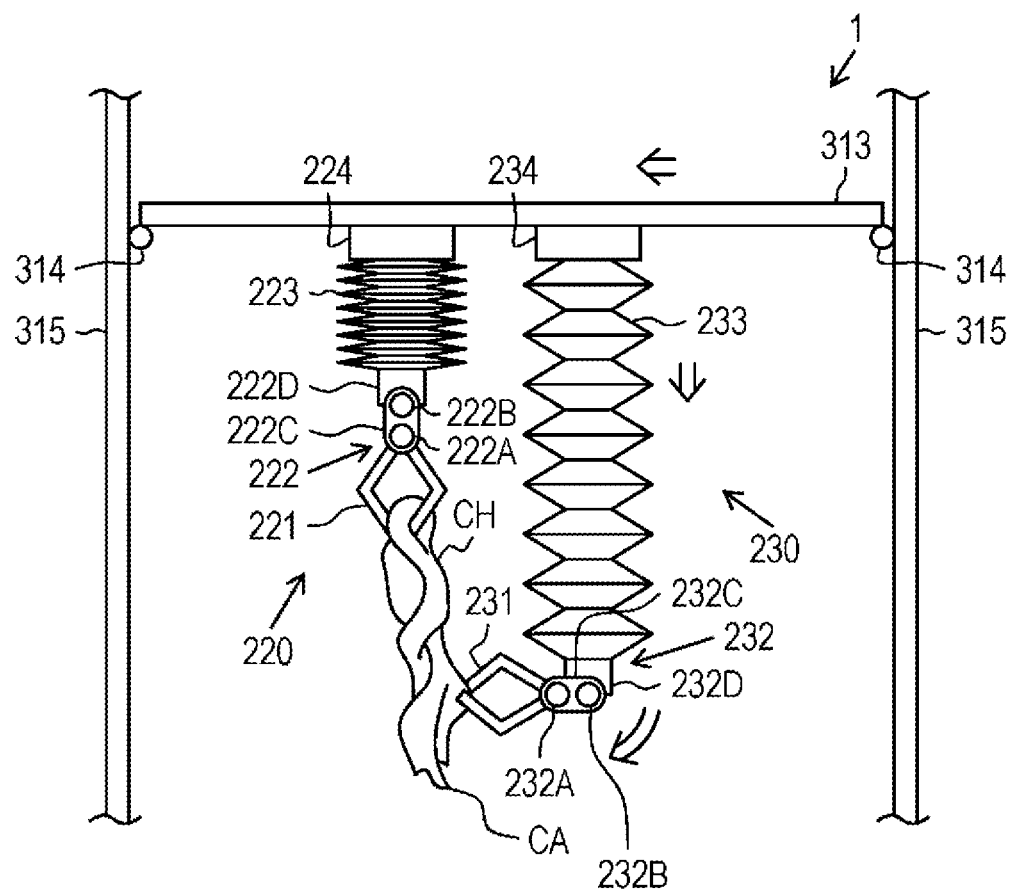
FIG. 14 is an operation diagram illustrating a sixth operation of the clothes processing apparatus in FIG. 2.
Figure 15:
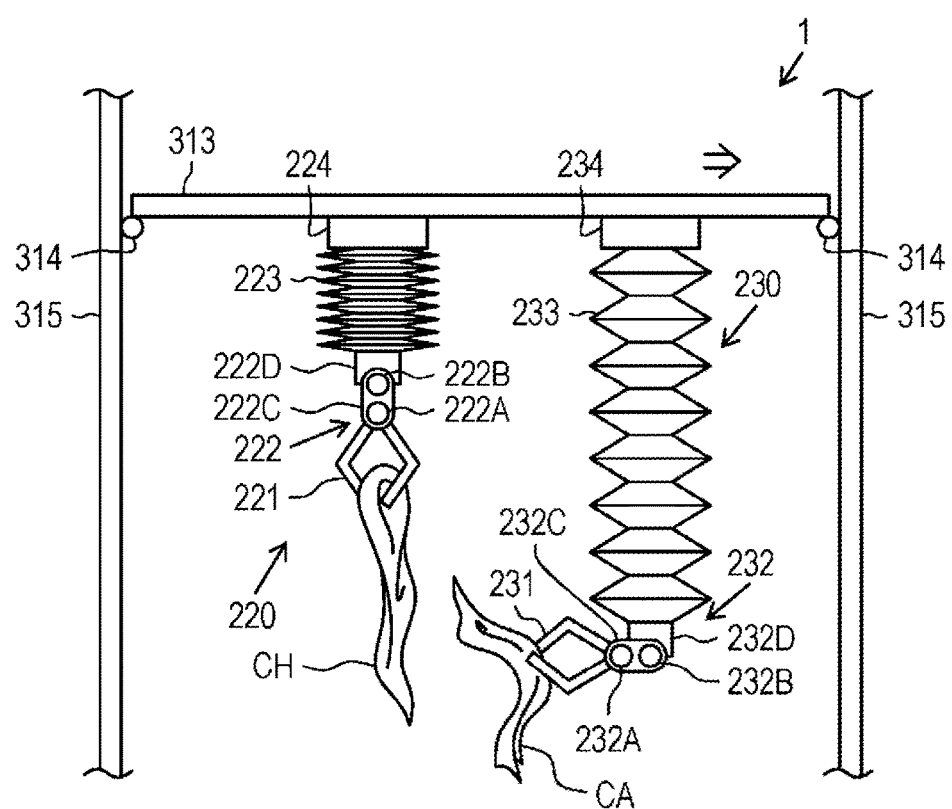
FIG. 15 is an operation diagram illustrating a seventh operation of the clothes processing apparatus in FIG. 2.

After ending the washing and drying control, control device 330 executes the unloading control illustrated in FIGS. 11 to 15. Note that FIGS. 11 and 13 are sectional views in the frontward-rearward direction of clothes processing apparatus 1, and a part of elements that configure clothes processing apparatus 1 are omitted. FIG. 12 is a sectional view in the horizontal direction of clothes processing apparatus 1, and a part of elements that configure clothes processing apparatus 1 are omitted. Note that FIGS. 14 and 15 are enlarged views of arms 220 and 230 and the peripheral parts thereof, and a part of elements that configure clothes processing apparatus 1 are omitted.

Control device 330 first causes imaging device 320 to image the inside of drum 71, and determines whether or not the clothes are present in drum 71, based on the image information. In a case where the control device determines that clothes are present in drum 71, control device 330 recognizes a position of the clothes based on the image information, and causes corresponding arm 220 or 230 to move to the unloading position. In an example, control device 330 causes first arm 220 to move to the unloading position. Specifically, control device 330 controls second vertical-direction drive portion 251, thereby causing first arm 220 to move to the lowermost position in the vertical direction of clothes processing apparatus 1. Then, control device 330 controls first motor 253A of second frontward-rearward-direction drive portion 252 and width-direction drive portion 253, thereby causing first arm 220 to move to the corresponding position right above the recognized clothes.

Then, control device 330 causes first arm 220 to grip the clothes. Then, control device 330 causes first arm 220 to lift gripped clothes CH as the clothes gripped by the arm, and determines whether or not the load detected by load detector 260 corresponding to first arm 220 at this time is lower than the predetermined load.

As illustrated in FIG. 11, control device 330 then executes a third operation. In other words, control device 330 causes first arm 220 to vibrate such that the gripped clothes CH moves in the vertical direction. Specifically, control device 330 first controls first extending-retracting motor 254D such that the reel of first arm 220 rotates in the second direction. Then, control device 330 controls first extending-retracting motor 254D such that the reel of first arm 220 rotates in the first direction. For example, control device 330 controls first extending-retracting motor 254D such that control on first extending-retracting motor 254D is repeatedly performed a plurality of times in a short time, and causes first arm 220 to vibrate. In this manner, the vibration of first arm 220 is transmitted to gripped clothes CH, the other clothes CA, and the like, which are entwined with gripped clothes CH.

As illustrated in FIG. 12, control device 330 then executes a fourth operation. In other words, control device 330 causes the wind supplied from blower 91 to blow to gripped clothes CH. Specifically, control device 330 first controls various types of arm drive unit 250 such that gripped clothes CH approach air supply port 65. Then, control device 330 controls fan motor 92, thereby causing blower 91 to rotate. In this manner, the wind by blower 91 is supplied to gripped clothes CH, the other clothes CA, and the like, which are entwined with gripped clothes CH.

As illustrated in FIG. 13, control device 330 then executes a fifth operation. In other words, control device 330 causes mounting board 110 to come into contact with gripped clothes CH. Specifically, control device 330 first controls first extending-retracting motor 254D such that gripped clothes CH and mounting board 110 take up substantially the same position in the vertical direction of clothes processing apparatus 1. Then, control device 330 controls first frontward-rearward-direction drive portion 132 such that mounting board 110 moves from the first position separated from first arm 220 in the frontward-rearward direction of clothes processing apparatus 1 to the second position at which the mounting board is able to come into contact with gripped clothes CH. Then, control device 330 controls first frontward-rearward-direction drive portion 132 such that mounting board 110 moves from the second position to the first position. Control device 330 performs control related to first frontward-rearward-direction drive portion 132 once or a plurality of times. In this manner, the force produced from the contact between gripped clothes CH and mounting board 110 is transmitted to gripped clothes CH, the other clothes CA, and the like, which are entwined with gripped clothes CH.

As illustrated in FIG. 14, control device 330 then executes a sixth operation. In other words, control device 330 causes second arm 230 to grip the other clothes CA which are entwined with gripped clothes CH. Specifically, control device 330 first controls width-direction drive portion 253, thereby causing a distance between first arm 220 and second arm 230 to be reduced. In an example, control device 330 controls second motor 253B of width-direction drive portion 253, thereby causing second arm 230 to approach first arm 220. Then, control device 330 controls second extending-retracting motor 255D such that the other clothes CA and claws 231 of second arm 230 take up substantially the same position in the vertical direction of clothes processing apparatus 1. Then, control device 330 further controls second angle-adjusting motor 255B such that the pair of claws 231 is tilted, for example, by 90° with respect to support board 234. Then, control device 330 causes second arm 230 to grip the other clothes CA.

As illustrated in FIG. 15, control device 330 then executes a seventh operation. In other words, control device 330 causes arms 220 and 230 to relatively operate. Specifically, control device 330 first controls width-direction drive portion 253 such that a distance between first arm 220 and second arm 230 increases in the horizontal direction of clothes processing apparatus 1. In an example, control device 330 controls second motor 253B of width-direction drive portion 253, thereby causing second arm 230 to be pulled apart from first arm 220. In this manner, gripped clothes CH and the other clothes CA are pulled apart from each other.

Then, control device 330 causes the clothes as the other clothes CA gripped by second arm 230 to return into drum 71. Control device 330 controls arm drive unit 250, thereby causing gripped clothes CH to be mounted on mounting board 110, and the unloading control is ended.

After ending the unloading control, control device 330 executes the straightening control. Control device 330 causes arms 220 and 230 or the like to straighten the clothes mounted on mounting board 110, and ends the straightening control. After ending the straightening control, control device 330 executes the folding control. Control device 330 causes folding board 410 to fold the clothes mounted on folding board 410, and ends the folding control. Control device 330 repeatedly executes the unloading control, the straightening control, and the folding control until all of the plurality of clothes accommodated in drum 71 are unloaded and folded.

According to the exemplary embodiment, the following effects are to be achieved.

(1) For example, clothes separating device 200 operates to grip one item of the clothes of a plurality of items of clothes in drum 71 by arms 220 and 230, and to separate the other clothes CA entwined with gripped clothes CH as the clothes gripped by the arms from the gripped clothes CH. Therefore, it is easy to separate the other clothes CA from gripped clothes CH. In other words, even when the plurality of clothes are intertwined with one another in drum 71, it is easy to separate the plurality of clothes into individual items of clothes. Therefore, a user is unlikely to encounter a situation in which it is necessary to separate the plurality of clothes into individual items of clothes before folding. As described above, clothes separating device 200 contributes to reducing a burden of work related to laundry.

(2) According to clothes separating device 200, corresponding extending-retracting motors 254D and 255D are controlled such that arms 220 and 230 which grip the clothes vibrate. In other words, the force is directly applied to the other clothes CA due to the operation of arms 220 and 230. Therefore, compared to a case of including another element that applies the force to the other clothes CA, clothes separating device 200 has a simplified configuration.

(3) In a case where gripped clothes CH move in the vertical direction, the force applied to the other clothes CA increases, compared to a case where the clothes move in the frontward-rearward direction or the horizontal direction. This is considered to be related to adding the weight of the other clothes CA to the force. According to clothes separating device 200, since arms 220 and 230 are caused to vibrate such that gripped clothes CH move in the vertical direction, it is much easier to separate the other clothes CA from griped clothes CH.

(4) In a case where the force is directly applied to the other clothes CA due to the operation of arms 220 and 230, the magnitude of the force applied to the other clothes CA is likely to rely on the weight or the like of clothes CA. On the other hand, in a case where the force is applied to the other clothes CA due to another factor other than the operation of arms 220 and 230, the magnitude of the force applied to the other clothes CA is unlikely to rely on the weight or the like of clothes CA. According to clothes separating device 200, since the force of the wind supplied from blower 91 is applied to the other clothes CA, the force having the stable magnitude is likely to be applied to the other clothes CA.

(5) In a case where a physical force is applied to the other clothes CA, the force is likely to be transmitted to the other clothes CA. According to clothes separating device 200, mounting board 110 moves with respect to arms 220 and 230, and thereby the physical force produced from the contact between gripped clothes CH and mounting board 110 is directly or indirectly applied to the other clothes CA. Therefore, it is much easier to separate the other clothes CA from gripped clothes CH.

(6) According to clothes separating device 200, mounting board 110 functions as the moving member. Therefore, compared to a case of including the moving member separately from mounting board 110, clothes separating device 200 has a simplified configuration.

(7) According to clothes separating device 200, one item of clothes of the plurality of clothes in drum 71 is gripped by one arm 220 or 230, and the other clothes CA entwined with the clothes is gripped by the other arm 220 or 230. Arms 220 and 230 are relatively operate, and thereby gripped clothes CH and the other clothes CA are pulled apart from one another, and the other clothes CA are separated from gripped clothes CH. In addition, even in a case where the other clothes CA is entwined with gripped clothes CH, it is easy to separate the other clothes CA from gripped clothes CH due to the operations of arms 220 and 230. Therefore, it is much easier to separate the other clothes CA from gripped clothes CH.

(8) In a case where a high load acts on arms 220 and 230 when the clothes gripped by arms 220 and 230 are lifted, gripped clothes CH are considered to be caught in drum 71. In this case, when control device 330 controls arms 220 and 230, there is a possibility that a strong force will act on a caught portion of gripped clothes CH and the caught portion will be degraded. On the other hand, according to clothes separating device 200, in a case where the control device determines that the load detected by load detector 260 is higher than or equal to a predetermined load, arms 220 and 230 that grips the clothes are controlled to be stopped. Therefore, a possibility of degradation of gripped clothes CH is reduced.

(9) According to clothes separating device 200, imaging device 320 images the inside of drum 71, and positions of the clothes accommodated in drum 71 are recognized from the image information. Therefore, it is easy for arms 220 and 230 to appropriately grip the clothes accommodated in drum 71.

(10) According to clothes separating device 200, in a case where imaging device 320 is caused to image the inside of drum 71 and the control device determines that clothes are present in drum 71, based on the image information, corresponding arms 220 and 230 grip the clothes and the clothes are unloaded from the inside of drum 71. Therefore, a possibility of remaining of clothes in drum 71 is reduced.

(11) According to clothes processing apparatus 1, clothes separating device 200 causes the plurality of clothes in drum 71 to be unloaded for each item of clothes, and the clothes unloaded from the inside of drum 71 are folded by folding device 400. Therefore, it is easy to fold, for each item of clothes, the plurality of clothes, which are washed, dried, or the like. As described above, clothes processing apparatus 1 contributes to reducing a burden of work related to laundry.

(12) According to clothes transport device 100, mounting board 110 is tilted with respect to mounting-board support 111 such that mounted clothes CS as clothes, which are mounted on mounting board 110, are dropped from mounting board 110 and are loaded in drum 71. As described above, since the clothes are loaded in drum 71 with a simple structure, a structure of clothes transport device 100 is simplified.

(13) According to clothes transport device 100, in a case where control device 330 causes imaging device 320 to image the top view of mounting board 110, and determines that clothes are present on mounting board 110 based on the image information, mounting board 110 is again tilted with respect to mounting-board support 111. Therefore, a possibility of remaining of clothes on mounting board 110 is reduced.

(14) According to clothes transport device 100, arms 220 and 230 are caused to grip mounted clothes CS with the predetermined strength, and mounted clothes CS are distinguished based on the reaction force detected by reaction force detector 140 at this time. For example, in a case where the reaction force detected by reaction force detector 140 is smaller than the predetermined reaction force, control device 330 causes the clothes gripped by arms 220 and 230 to move to accommodation unit 120, and the clothes remaining on mounting board 110 are separately washed. In other words, control device 330 distinguishes between mounted clothes CS, based on the thickness of clothes, and the clothes are divided into two groups such that washing is performed twice. Therefore, clothes having thicknesses which are largely different are not washed at the same time, and thus the clothes subjected to the washing, drying, and the like are unlikely to be entwined with one another.

Modification Examples

The embodiment is described as only an example of aspects of the clothes separating device and the clothes processing apparatus according to this disclosure, and is not provided to limit the aspects are not intended to the embodiment. The clothes separating device and the clothes processing apparatus according to this disclosure can have modification examples of the embodiment which are described below, in addition to the embodiment, and can have aspects configured by combining at least two modification examples which are compatible to each other.

According to control device 330 of a modification example, the process in Step S11 is omitted from the processes of the loading control illustrated in FIG. 7.

According to control device 330 of another modification example, the processes in Step S24 and Step S25 are omitted from the processes of the unloading control illustrated in FIG. 8. In this case, clothes separating device 200 may have an aspect in which [0174]

Control device 330 of the modification example controls various types of arm drive units 250 corresponding to the one arm 220 or 230 that grips the clothes, in Step S26 illustrated in FIG. 8, thereby causing one arm 220 or 230 to vibrate such that gripped clothes CH moves in at least one direction of the frontward-rearward direction and the horizontal direction.

Clothes separating device 200 of the modification example includes another blower separately from blower 91 of washing machine 40. According to the modification example, in Step S27, control device 330 controls arm drive unit 250 or the like such that the wind is supplied from the other blower toward gripped clothes CH.

Clothes separating device 200 of the modification example further includes a moving member that is movable with respect to arms 220 and 230. According to the modification example, in Step S28, for example, control device 330 controls the moving member such that the moving member moves from the first position separated from arms 220 and 230 to the second position at which the moving member is able to come into contact with gripped clothes CH.

According to control device 330 of another modification example, at least one process of the processes in Step S26, Step S27, and Step S28 is omitted from the processes of the unloading control illustrated in FIG. 8.

According to control device 330 of another modification example, the processes in Step S29 and Step S30 are omitted from the processes of the unloading control illustrated in FIG. 8.

The plurality of types of control executed by control device 330 can be arbitrarily changed. Examples of the plurality of types of control include the loading control, the washing and drying control, and the unloading control. According to the modification example, clothes processing apparatus 1 may have an aspect in which folding device 400 is omitted. Other examples of the plurality of types of control include the washing and drying control, the unloading control, the straightening control, and the folding control. According to the modification example, clothes processing apparatus 1 may have an aspect in which clothes transport device 100 is omitted. Other examples of the plurality of types of control include the washing and drying control, and the unloading control.

Figure 16:
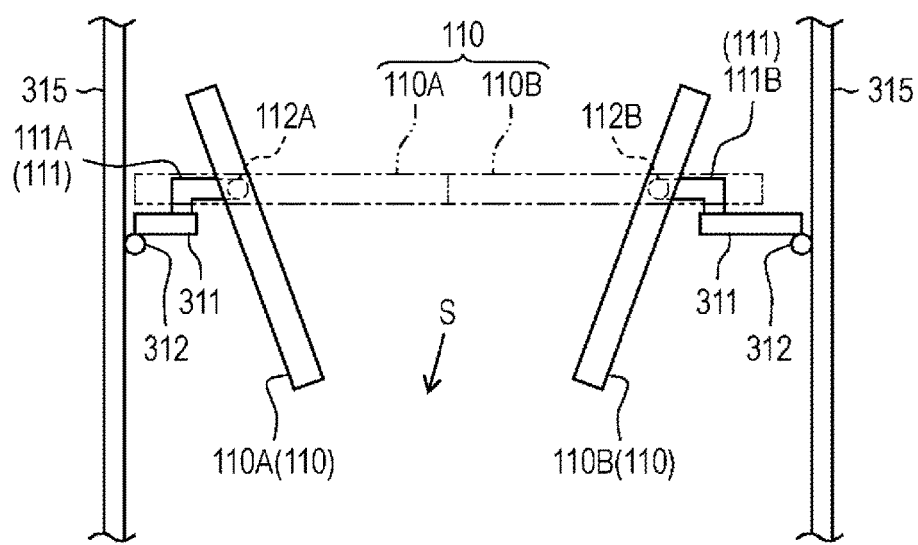
FIG. 16 is a front view illustrating a structure of a mounting board of a modification example.

Mounting board 110 of the modification example includes first mounting board 110A as a first transport unit and second mounting board 110B as a second transport unit, which are separable from each other as illustrated in FIG. 16. For example, first mounting board 110A is supported by first mounting-board support 111A in a tiltable manner via first rotary shaft 112A. For example, second mounting board 110B is supported by second mounting-board support 111B in a tiltable manner via second rotary shaft 112B. Mounting-board supports 111A and 111B support corresponding mounting boards 110A and 110B such that mounting boards 110A and 110B are separated from each other and are tilted, and thereby space S is formed between first mounting board 110A and second mounting board 110B. Note that the intermediate portion of first support pipe 311 is omitted such that the first support pipe does not come into contact with mounting boards 110A and 110B when mounting boards 110A and 110B are tilted.

Rotation drive portion 133 (refer to FIG. 6) includes first rotary shaft 112A, second rotary shaft 112B, a first motor (not illustrated) that is coupled to first rotary shaft 112A, and a second motor (not illustrated) that is coupled to second rotary shaft 112B. Control device 330 (refer to FIG. 6) causes the motors to be synchronized and rotate, thereby tilting mounting boards 110A and 110B with respect to mounting-board supports 111A and 111B. Mounted clothes CS as the clothes mounted on mounting boards 110A and 110B are dropped from space S formed with mounting boards 110A and 110B separated from each other and tilted, and the clothes are loaded in drum 71 (refer to FIG. 3).

According to clothes processing apparatus 1 of another modification example, accommodation unit 120 is omitted from clothes transport device 100. According the modification example, the processes in Step S3 to Step S7 are omitted from the processes of the loading control illustrated in FIG. 7. In this case, clothes transport device 100 may have an aspect in which reaction force detector 140 is omitted.

Clothes processing apparatus 1 of another modification example may have an aspect in which imaging device 320 is omitted.

According to first arm 220 of another modification example, at least one of second rotary shaft 222B and rotary plate 222D is omitted from claw rotating mechanism 222. In this case, arm drive unit 250 may have an aspect in which corresponding various types of motors 254B and 254C are omitted. Note that the same modification may also be performed in second arm 230.

Folding device 400 of a modification example includes mounting board 110, arms 220 and 230, arm drive unit 250, and imaging device 320, instead of folding board 410 and folding drive unit 420. According to the modification example, control device 330 causes imaging device 320 to image the clothes straightened on mounting board 110, and controls arm drive unit 250, based on the image information, thereby causing arms 220 and 230 to fold the clothes.

Clothes processing apparatus 1 of another modification example includes, for example, a vertical type washing machine, instead of the drum type washing machine 40. The vertical type washing machine has substantially the same configuration as washing machine 40.

Clothes transport device 100 of another modification example includes another transport unit having substantially the same function as mounting board 110, instead of mounting board 110.

Clothes separating device 200 of another modification example includes another gripping unit having substantially the same function as arms 220 and 230, instead of arms 220 and 230.

The number of claws 221 of first arm 220 may be arbitrarily changed. According an example, first arm 220 includes three or more claws 221. Note that the same modification may also be performed in second arm 230.

The number of arms included in separator 210 may be arbitrarily changed. According an example, separator 210 further includes one or more other arms, in addition to first arm 220 and second arm 230. According to another example, one of first arm 220 or second arm 230 is omitted from separator 210.

(Appendix Regarding Solution to Problem)

A clothes transport device of a first aspect of this disclosure includes a transport unit that is capable of transporting clothes into a washing tub, and a transport support that supports the transport unit in a tiltable manner such that clothes mounted on the transport unit are dropped from the transport unit and are loaded into the washing tub.

In the clothes transport device of a second aspect, the transport unit includes first transport unit and second transport unit which are separable from each other, in which the transport support supports the first transport unit and the second transport unit in a tiltable manner such that the first transport unit and the second transport unit are separated from each and are tilted, and thereby a space is formed between the first transport unit and the second transport unit.

The clothes transport device of a third aspect further includes an actuator that causes the transport unit to be tilted with respect to the transport support and a control device that controls the actuator.

The clothes transport device of a fourth aspect further includes an imaging device that is capable of imaging the transport unit, in which the control unit controls the actuator, based on image information acquired by the imaging device.

In the clothes transport device of a fifth aspect, in a case where the control unit determines that clothes are present on the transport unit, based on image information acquired by the imaging device, the actuator is controlled such that the clothes are loaded in the washing tub.

The clothes transport device of a sixth aspect further includes an arm that is capable of grip the clothes, a reaction force detector that detects a reaction force acting on the arm when the arm grips the clothes, and an accommodation unit that can accommodate the clothes, in which, in a case where the reaction force detected by the reaction force detector is smaller than a predetermined reaction force, the control device causes the clothes gripped by the arm to move to the accommodation unit from the transport unit.

INDUSTRIAL APPLICABILITY

The clothes separating device and the clothes processing apparatus including the same according this disclosure can be used in various clothes processing apparatus including industrial and household uses.

The invention claimed is:

1. A clothes separating device comprising:
a separator including a plurality of individual gripping units, wherein the plurality of individual gripping units are located apart from each other and are disposed above a washing tub of a washing machine, wherein each individual gripping unit operates and moves independently horizontally and vertically, such that a first gripping unit is configured to be lowered into the washing tub to grip clothes and to separate through an upward actuation movement, a particular item of clothe which is entwined among the gripped clothes.

2. The clothes separating device of claim 1,
wherein the separator includes a force applying unit that applies a force through the first gripping unit to the gripped clothes in order to separate the particular item of clothe from among the entwined gripped clothes.

3. The clothes separating device of claim 2,
wherein the force applying unit includes an actuator that causes the first gripping unit to vibrate.

4. The clothes separating device of claim 3,
wherein the force applying unit causes the first gripping unit to vibrate such that the clothes gripped by the first gripping unit actuate in a vertical direction.

5. The clothes separating device of claim 2,
wherein the force applying unit has a blower.

6. The clothes separating device of claim 2,
wherein the force applying unit has a moving member that is capable of moving with respect to the first gripping unit, and
wherein the moving member is capable of moving from a first position, which is separate from the first gripping unit, to a second position at which the moving member is able to come into contact with the particular item of clothe gripped by the first gripping unit.

7. The clothes separating device of claim 6,
wherein the moving member has a transport unit that is capable of transporting clothes into the washing tub.

8. The clothes separating device of claim 1,
wherein the separator has a second gripping unit which operates independently to grip more other clothes in the washing tub, and
wherein the first gripping unit and the second gripping unit operate cooperatively so as to separate different item of clothes from the gripped clothes.

9. The clothes separating device of claim 8, further comprising:
a control device that controls the plurality of individual gripping units.

10. The clothes separating device of claim 9, further comprising:
a load detector that detects a load acting on the first gripping unit,
wherein the control device controls the first gripping unit, based on the load detected by the load detector.

11. The clothes separating device of claim 10,
wherein the control device stops the first gripping unit in a case where the load detected by the load detector is higher than or equal to a predetermined load.

12. The clothes separating device of claim 9, further comprising:
an imaging device that is capable of imaging the clothes inside the washing tub,
wherein the control device controls the plurality of individual gripping units, based on image information acquired by the imaging device.

13. The clothes separating device of claim 12,
wherein, in a case where the control device determines that the clothes are present in the washing tub, based on the image information acquired by the imaging device, the control device controls the first gripping unit such that the clothes in the washing tub are gripped.

14. The clothes separating device of claim 1, wherein the clothes separating device being a portion of a clothes processing apparatus which comprises:
the washing machine that includes the washing tub and a dryer that dries the clothes;
a folding device that folds clothes unloaded from the washing tub by the separator.

15. The clothes separating device of claim 1,
wherein the second gripping unit grips the different item of clothes entwined with the clothes gripped by the first gripping unit.

* * * * *